US012811071B2

(12) United States Patent
Alkhaldi et al.

(10) Patent No.: US 12,811,071 B2
(45) Date of Patent: Nov. 24, 2026

(54) ZINC-VANADIUM-NICKEL OXIDE NANO-FLAKES IN FLEXIBLE BIOCHAR MATRIX FOR SUPERCAPACITORS

(71) Applicant: Imam Abdulrahman Bin Faisal University, Dammam (SA)

(72) Inventors: Rana Alkhaldi, Dammam (SA); Emre Cevik, Dammam (SA); Sarah Asiri, Dammam (SA); Mohammad Saood Manzar, Dammam (SA); Seyda Tugba Gunday Anil, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 150 days.

(21) Appl. No.: 19/038,448

(22) Filed: Jan. 27, 2025

(65) Prior Publication Data

US 2026/0221350 A1 Jul. 30, 2026

(51) Int. Cl.

*H01G 11/38* (2013.01)
*H01G 11/04* (2013.01)
*H01G 11/24* (2013.01)
*H01G 11/46* (2013.01)

(52) U.S. Cl.

CPC ............. *H01G 11/38* (2013.01); *H01G 11/04* (2013.01); *H01G 11/24* (2013.01); *H01G 11/46* (2013.01)

(58) Field of Classification Search

CPC ........ H01G 11/38; H01G 11/04; H01G 11/24; H01G 11/46

See application file for complete search history.

(56) References Cited

U.S. PATENT DOCUMENTS

2023/0335347 A1* 10/2023 Cevik .................... H01G 11/04
2024/0088371 A1 3/2024 Cevik et al.
2024/0234686 A1 7/2024 Cevik et al.

FOREIGN PATENT DOCUMENTS

CN 112233909 B 3/2022
CN 116247191 A 6/2023
KR 10-2610061 B1 12/2023

OTHER PUBLICATIONS

Zhang et al., High-capacity zinc vanadium oxides with long-term cyclability enabled by in-situ electrochemical oxidation as zinc-ion battery cathode, 2022, Chemical Engineering Journal, 445, (2022), 136714, pp. 1-12 (Year: 2022).*

A. Sai Kumar, et al., "Synthesis of flower-type nanorods with Zn-doped manganese vanadate (Mn(VO3)2) and carbon nanofibers (CNFs) for enhanced performance in battery-type supercapacitors", Journal of Industrial and Engineering Chemistry, vol. 135, Jul. 25, 2024, pp. 586-595, 7 pages.

Hao Jiang, et al., "Construction of Nano ZnV2O4/N-Doped Porous Carbon Composites with Optimized Ionic and Electronic Conductivities as Competitive Cathodes toward Zinc-Ion Capacitors", ChemNanoMat, Sep. 17, 2024, 2 pages, Abstract only.

* cited by examiner

*Primary Examiner* — Eric W Thomas
(74) *Attorney, Agent, or Firm* — Oblon, McClelland, Maier & Neustadt, L.L.P.

(57) ABSTRACT

A capacitor includes electrodes including a composite electrode composition including zinc-vanadium-nickel oxide ($ZnV_2O_4/NiO$) (ZNV) particles, a biochar (BC), a conductive carbon (CC), and a polymer binder, a dielectric separator, and an electrolyte. The amount of ZNV particles present in the composite electrode composition is in a range from 1-20 weight percent (wt. %) relative to the combined amount of the BC, CC, and polymer binder. The specific capacitance of the composite electrode composition is greater than or equal to 150 farad per gram (F/g) measured at 1 millivolts per second (mV/s).

20 Claims, 31 Drawing Sheets

ZINC-VANADIUM-NICKEL OXIDE NANO-FLAKES IN FLEXIBLE BIOCHAR MATRIX FOR SUPERCAPACITORS

BACKGROUND

Technical Field

The present disclosure is directed to a supercapacitor, and more particularly, a zinc-vanadium-nickel oxide ($ZnV_2O_4$/NiO) and biochar (BC)-based supercapacitor (ZNV@BC).

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present disclosure.

The ever-increasing demand for energy storage applications in modern technology has stimulated researchers to explore the state of the art of materials, designs, growth techniques, and treatments for electrodes in electrochemical storage applications. Smart electronics, wearable textiles, hybrid electric vehicles, integrated systems, along with renewable sources of energy (from wind, solar, biomass, and hydropower), all rely on electrochemical energy storage. Among various energy storage systems, electrochemical capacitors (ECs) are favorable for use with devices related to renewable energy (e.g., photovoltaic, solar cells, etc.) over batteries due to their high charging/discharging rate (high power density) and unlimited cycling life. Most research is devoted to fulfilling the growing interest in carbon-based capacitors since these materials offer accessibility, low cost, and various morphologies with high conductivity and stability. Among all carbon-based materials, biochar (BC) exhibits properties like a highly porous structure, diverse surface functional groups, large specific surface area, and high mineral content, making it effective for adsorption.

Transition metal oxides (TMOs), such as manganese dioxide ($MnO_2$), ruthenium dioxide ($RuO_2$), nickel (II) oxide (NiO), vanadium oxide ($V_2O_5$), and cobalt (III) oxide ($Co_2O_3$), are favorable materials for pseudocapacitors [See: Mohanadas, D. et al.; A bifunctional asymmetric electrochromic supercapacitor with multicolor property based on nickel oxide/vanadium oxide/reduced graphene oxide, *Journal of Energy Storage*, Volume 48, 2022, 103954]. The compositions of zinc-nickel-vanadium oxide (ZNV), along with binary and ternary metal oxide systems, play a central role in wide-range applications. Nickel vanadium oxide ($NiV_2O_6$) nanocomposites are synthesized by two methods (hydrothermal and solvothermal), and their application in photocatalytic performance for wastewater treatment has been reported [See: George, A., et al., Regeneration study of MB in recycling runs over nickel vanadium oxide by solvent extraction for photocatalytic performance for wastewater treatments, *Environ Res.,* 2022, 211, 112970.]. The crystalline morphology of $NiV_2O_6$@amorphous cobalt boride nanocomposites improved the capacitance performance for hybrid supercapacitors with activated carbon (1789 farad per gram (F/g) at 500 milliamperes per gram (mA/g) compared to 1.5 times of $Ni_3V_2O_8$ and 3.8 times of Co—B [See: Jing-Feng, H., et al., A crystalline nickel vanadium oxide @amorphous cobalt boride nanocomposites with enhanced specific capacity for hybrid supercapacitors, *Electrochimica Acta*, Volume 377, 2021, 138086]. An asymmetric electrochromic supercapacitor using a ternary material of nickel oxide/vanadium oxide/reduced graphene oxide ($NiO/V_2O_5$/rGO) for the positive electrode reported an outstanding specific capacitance of 1265.5 F/g, compared to rGO (40.9 F/g), NiO (130.5 F/g), $V_2O_5$ (521.2 F/g), and $NiO/V_2O_5$ (707.3 F/g) [See: Mohanadas, D. et al.; A bifunctional asymmetric electrochromic supercapacitor with multicolor property based on nickel oxide/vanadium oxide/reduced graphene oxide, *Journal of Energy Storage*, Volume 48, 2022, 103954].

Although several nanocomposites have been developed in the past for supercapacitors, there still exists a need to fabricate and explore more efficient nanocomposites to achieve enhanced capacitance.

SUMMARY

In an exemplary embodiment, a capacitor is described. The capacitor includes electrodes including a composite electrode composition including zinc-vanadium-nickel oxide ($ZnV_2O_4$/NiO) (ZNV) particles, a biochar (BC), a conductive carbon (CC), and a polymer binder, a dielectric separator, and an electrolyte. The amount of ZNV particles present in the composite electrode composition is in a range from 1-20 weight percent (wt. %) relative to the combined amount of the BC, CC, and polymer binder. The specific capacitance of the composite electrode composition is greater than or equal to 150 farad per gram (F/g) measured at 1 millivolts per second (mV/s).

In some embodiments, the amount of the ZNV particles present in the composite electrode composition is in a range from 3-15 wt. % relative to the combined amount of the BC, CC, and polymer binder.

In some embodiments, the amount of the ZNV particles present in the composite electrode composition is in a range from 6-8 wt. % relative to the combined amount of the BC, CC, and polymer binder.

In some embodiments, the amount of the BC present in the composite electrode composition is in a range from 60 to 95 wt. % of the total amount of the BC, CC, and polymer binder.

In some embodiments, the amount of the BC present in the composite electrode composition is in a range from 75 to 85 wt. % of the total amount of the BC, CC, and polymer binder.

In some embodiments, the amount of the BC present in the composite electrode composition is 80 wt. % of the total amount of the BC, CC, and polymer binder.

In some embodiments, the amount of the CC present in the composite electrode composition is in a range from 2 to 20 wt. % of the total amount of the BC, CC, and polymer binder.

In some embodiments, the amount of the CC present in the composite electrode composition is in a range from 5 to 15 wt. % of the total amount of the BC, CC, and polymer binder.

In some embodiments, the amount of the CC present in the composite electrode composition is 10 wt. % of the total amount of the BC, CC, and polymer binder.

In some embodiments, the amount of the polymer binder present in the composite electrode composition is in a range from 2 to 20 wt. % of the total amount of the BC, CC, and polymer binder.

In some embodiments, the amount of the polymer binder present in the composite electrode composition is in a range from 5 to 15 wt. % of the total amount of the BC, CC, and polymer binder.

In some embodiments, the amount of the polymer binder present in the composite electrode composition is 10 wt. % of the total amount of the BC, CC, and polymer binder In some embodiments, the specific capacitance of the composite electrode composition is greater than or equal to 170 F/g measured at 1 mV/s.

In some embodiments, the specific capacitance of the composite electrode composition is greater than or equal to 190 F/g measured at 1 mV/s.

In some embodiments, the ZNV particles have two-dimensional petal-like morphologies and a diameter in the range of 0.5 to 20 micrometers (μm).

In some embodiments, the ZNV particles have a diameter in the range of 1 to 10 μm.

In some embodiments, the ZNV particles have a diameter in the range of 3 to 7 μm.

In some embodiments, the specific capacitance of the composite electrode composition is greater than or equal to 180 F/g measured after 2000 applied cycles in a coin cell.

In some embodiments, the specific capacitance of the composite electrode composition is greater than or equal to 150 F/g measured after 4000 applied cycles in a coin cell.

In some embodiments, the specific capacitance of the composite electrode composition is greater than or equal to 130 F/g measured after 5000 applied cycles in a coin cell.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
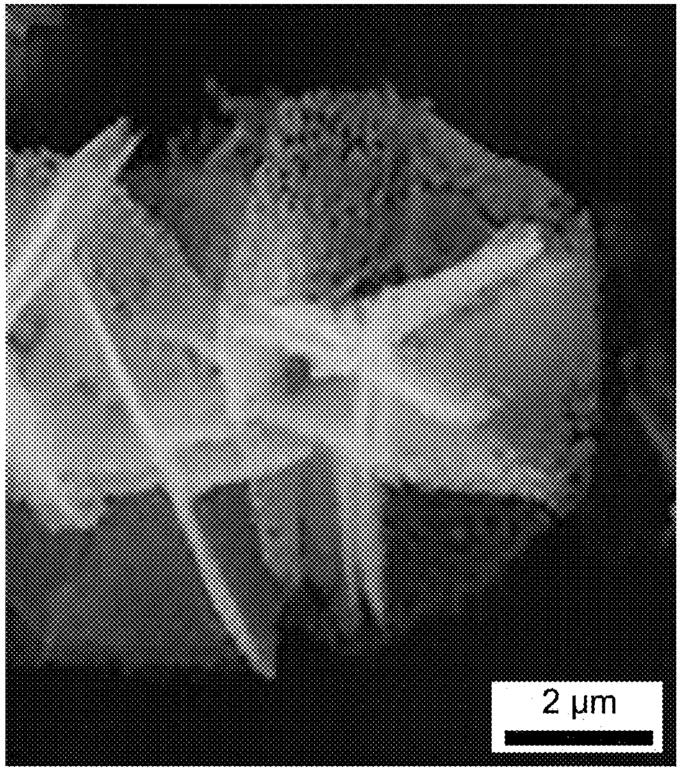
FIG. 1A shows a scanning electron microscopic (SEM) image of a zinc-vanadium-nickel oxide (ZNV) composite, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'compound' refers to a chemical entity, regardless of its phase—solid, liquid, or gaseous—as well as its state—crude mixture, purified, or isolated.

As used herein, the term 'amount' refers to the level or concentration of one or more reactants, catalysts, or materials present in a reaction mixture.

As used herein, the term 'particle' refers to a small object that acts as a whole unit with regard to its transport and properties.

As used herein, the terms 'particle size' or 'particle diameter' may be thought of as the length or longest dimension of a particle. The greatest distance that can be measured from one point on a shape through its center to a point directly across from it is referred to as the 'diameter' for a circle, oval, ellipse, and multilobe.

As used herein, the term 'nanoparticles (NPs)' refers to particles having a particle size of 1 nanometer (nm) to 500 nm within the scope of the present disclosure.

As used herein, the term 'nanocomposite' refers to a composite material that has at least one component with a grain size measured in nanometers.

As used herein, the term 'porosity' refers to a measure of the void or vacant spaces within a material.

As used herein, the term 'pore diameter' may be thought of as the length or longest dimension of a pore opening.

As used herein, the term 'pore volume' refers to the total volume of the empty spaces, or pores, within a material.

As used herein, the term 'room temperature' refers to a temperature range of '25 degrees Celsius (±C.)±3° C. in the present disclosure.

As used herein, the term 'biochar (BC)' refers to a type of charcoal produced from the thermal decomposition of organic materials, such as agricultural waste, wood chips, or plant residues, under low-oxygen conditions.

As used herein the term 'deionized water' refers to the water that has (most of) the ions removed.

As used herein, the term 'electrochemical cell' refers to a device capable of generating electrical energy from chemical reactions or using electrical energy to cause chemical reactions.

As used herein, the term 'electrode' refers to an electrical conductor used to contact a non-metallic part of a circuit, such as a semiconductor, an electrolyte, a vacuum, or air.

As used herein, the term 'electrolyte' refers to substances that conduct electric current because of the dissociation of the electrolyte into positively and negatively charged ions.

As used herein, the term 'binder' refers to compounds or substances that hold or bind together different components of a composite to form a cohesive whole mechanically, chemically, by adhesion or cohesion.

As used herein, a 'voltammogram' refers to a graphical representation of current versus voltage, typically obtained during cyclic voltammetry, used to analyze the electrochemical behavior of materials.

As used herein, the term 'current density' refers to the amount of electric current traveling per unit cross-section area.

As used herein, the term 'capacitance' refers to the capability of a material/device to store electric charge.

As used herein, the term 'energy density' refers to the amount of energy stored in a supercapacitor per unit volume of supercapacitor.

As used herein, the term 'power density' refers to the measure of power output per unit volume.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material. In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward a zinc-vanadium-nickel oxide ($ZnV_2O_4$/NiO) and biochar (BC)-based supercapacitor (ZNV@BC). ZNV@BC electrodes show increased charge storage capacities with a tendency toward capacitance-like behavior when used with aqueous sodium sulfate ($Na_2SO_4$) as the electrolyte in three-electrode cell.

A capacitor is includes electrodes including a composite electrode composition including $ZnV_2O_4$/NiO (ZNV) particles, a BC, a conductive carbon (CC), a polymer binder, a dielectric separator, and an electrolyte. A capacitor stores electrical energy in an electric field formed by two conducting plates (electrodes) separated by a dielectric material; when voltage is applied, it accumulates charge and can release energy when required. In some embodiments, the electrode may be formed using one of the techniques like the drop-casting method, spray coating, spin coating, dip coating, physical vapor deposition (PVD), aerosol-assisted chemical vapor deposition (AACVD), or molecular beam epitaxy (MBE).

In the first aspect, the capacitor includes ZNV particles. In some embodiments, $ZnV_2O_4$ has a high electrochemical stability and capacity, while NiO enhances conductivity and charge storage efficiency. When combined, these materials can give higher specific capacitance, better cycling stability, and faster charge/discharge rates than standard electrode materials. Combining $ZnV_2O_4$ and NiO in capacitors can improve energy density, power density, and efficiency, making them suitable for advanced energy storage applications.

In some embodiments, the ZNV particles may have different morphologies, such as wires, crystals, rectangles, triangles, pentagons, hexagons, prisms, ovals, petals, needles, disks, cubes, ribbons, blocks, beads, toroids, barrels, granules, whiskers, flakes, foils, powders, boxes, stars, tetrapods, belts, flowers, cones, pyramids, cylinders, polygonal, etc., and mixtures thereof. In a preferred embodiment, the ZNV particles have two-dimensional petal-like morphology.

In some embodiments, the ZNV particles have two-dimensional petal-like morphologies and a diameter in the range of 0.5-20 micrometers (μm), preferably 1-19 μm, preferably 2-18 μm, preferably 3-17 μm, preferably 4-16 μm, preferably 5-15 μm, preferably 6-14 μm, preferably 7-13 μm, preferably 8-12 μm, and preferably 9-11 μm. In some embodiments, the ZNV particles have a diameter in the range of 1-10 μm, preferably 2-9 μm, preferably 3-8 μm, preferably 4-7 μm, and preferably 5-6 μm. In some embodiments, the ZNV particles have a diameter in the range of 3-7 μm, and preferably 4-6 μm. In a preferred embodiment, the ZNV particles have a diameter of 5 μm. In one or more embodiments, the ZNV particles are made up of stable agglomerations of smaller particles.

In the second aspect, the capacitor includes a BC. BC is a carbon-rich material generated from organic waste via pyrolysis. BC, a biocarbon-based material, has gained attention due to its unique properties and diverse applications. It has become a focus of multidisciplinary research, including magnetic adsorption in wastewater treatment, removal of various organic and inorganic pollutants, and energy storage. BC is a pyrogenic carbonaceous material produced through the oxygen-free thermochemical process known as pyrolysis. Various feedstocks, such as wood, agricultural waste, urban sludge, and the organic fractions of municipal solid waste, can be used to produce BC. The BC produced from vegetable waste has potential advantages in various applications, such as in the agro-industry, cement mortar, waste management, and fuel production (via anaerobic digestion), as well as the purification of aqueous solutions contaminated with phthalate acid esters (PAEs) and ammonia nitrogen.

BC is increasingly being investigated as a sustainable alternative to traditional carbon-based materials such as activated charcoal. Its use in capacitors can improve charge-discharge cycles and overall performance while minimizing the environmental impact of capacitor manufacturing. Furthermore, the porous structure of BC gives additional surface area for energy storage, which may increase the energy density of supercapacitors. BC is a useful supercapacitor component because of its large surface area, porosity, and conductivity to increase energy storage capacity. In a preferred embodiment, vegetable waste is utilized as the feedstock for the production of BC via the pyrolysis process, followed by chemical activation with potassium hydroxide (KOH) to eliminate impurities other than carbon.

In the third aspect, the capacitor includes a CC as a substrate. The CC substrate may be selected from the group, including a graphite substrate, reduced graphene oxide, carbon nanotubes, carbon nanofibers, carbon black, an acetylene black substrate, and a graphene substrate. The CC substrate boosts the overall performance of the capacitor by enhancing its energy density, charge/discharge efficiency, and lifetime. In alternate embodiments, the substrate may be a CC substrate, graphite substrate, an aluminum foam, a nickel foam, a titanium foam, a titanium alloy foam, an aluminum alloy foam, a magnesium alloy foam, a nickel alloy foam, or a steel foam.

In the fourth aspect, the capacitor includes a polymer binder. The polymer binder in a capacitor or energy storage device holds the active materials together, leading to mechanical stability and facilitating ion flow. Generally, the polymer binder is an insulating substance that improves adherence of electrode to current collectors, allowing the structure to remain intact throughout cycling (charge/discharge). Suitable examples of polymer binders include polyvinylidene fluoride (PVDF)-based polymers, and its co- and terpolymers with hexafluoroethylene, tetrafluoroethylene, chlorotrifluoroethylene, chlorotrifluoroethylene, polyvinyl fluoride. Other examples of polymer binders include styrene-butadiene rubber, polytetrafluoroethylene (PTFE), ethylene chlorotrifluoroethylene (ECTFE), ethylene tetrafluoroethylene (ETFE), fluorinated-ethylene-propylene (FEP), perfluoro-alkoxy (PFA), polychlorotrifluoroethylene (PCTFE), sulfonated tetrafluoroethylene (Nafion®), polybutadiene, cyanoethyl cellulose, carboxymethyl cellulose, polyacrylonitrile, ethylene propylene diene terpolymers (EPDM), polyimides, ethylene-vinyl acetate copolymers, and combinations thereof. In a preferred embodiment, the binding polymer is PVDF.

In some embodiments, the amount of ZNV particles present in the composite electrode composition is in a range from 1-20 weight percent (wt. %), preferably 2-19 wt. %, preferably 3-18 wt. %, preferably 4-17 wt. %, preferably 5-16 wt. %, preferably 6-15 wt. %, preferably 7-14 wt. %, preferably 8-13 wt. %, preferably 9-12 wt. %, and preferably 10-11 wt. % relative to the combined amount of the BC, CC, and polymer binder. In some embodiments, the amount of the ZNV particles present in the composite electrode composition is in a range from 3-15 wt. %, preferably 4-14 wt. %, preferably 5-13 wt. %, preferably 6-12 wt. %, preferably 7-11 wt. %, and preferably 8-10 wt. % relative to the combined amount of the BC, CC, and polymer binder. In some embodiments, the amount of the ZNV particles present in the composite electrode composition is in a range from 6-8 wt. % and preferably 7 wt. % relative to the combined amount of the BC, CC, and polymer binder.

In some embodiments, the amount of the BC present in the composite electrode composition is in a range from 60-95 wt. %, preferably 61-94 wt. %, preferably 62-93 wt. %, preferably 63-92 wt. %, preferably 64-91 wt. %, preferably 65-90 wt. %, preferably 66-89 wt. %, preferably 67-88 wt. %, preferably 68-87 wt. %, preferably 69-86 wt. %, preferably 70-85 wt. %, preferably 71-84 wt. %, preferably 72-83 wt. %, preferably 73-82 wt. %, preferably 74-81 wt. %, preferably 75-80 wt. %, preferably 76-79 wt. %, and preferably 77-78 wt. % of the total amount of the BC, CC, and polymer binder. In some embodiments, the amount of the BC present in the composite electrode composition is in a range from 75-85 wt. %, preferably 76-84 wt. %, preferably 77-83 wt. %, preferably 78-82 wt. %, preferably 79-81 wt. % of the total amount of the BC, CC, and polymer binder. In a preferred embodiment, the amount of the BC present in the composite electrode composition is 80 wt. % of the total amount of the BC, CC, and polymer binder.

In some embodiments, the amount of the CC present in the composite electrode composition is in a range from 2-20 wt. %, preferably 3-19 wt. %, preferably 4-18 wt. %, preferably 5-17 wt. %, preferably 6-16 wt. %, preferably 7-15 wt. %, preferably 8-14 wt. %, preferably 9-13 wt. %, and preferably 10-12 wt. % of the total amount of the BC, CC, and polymer binder. In some embodiments, the amount of the CC present in the composite electrode composition is in a range from 5-15 wt. %, preferably 6-14 wt. %, preferably 7-13 wt. %, preferably 8-12 wt. %, and preferably 9-11 wt. % of the total amount of the BC, CC, and polymer binder. In a preferred embodiment, the amount of the CC present in the composite electrode composition is 10 wt. % of the total amount of the BC, CC, and polymer binder.

In some embodiments, the amount of the polymer binder present in the composite electrode composition is in a range from 2-20 wt. %, preferably 3-19 wt. %, preferably 4-18 wt. %, preferably 5-17 wt. %, preferably 6-16 wt. %, preferably 7-15 wt. %, preferably 8-14 wt. %, preferably 9-13 wt. %, and preferably 10-12 wt. % of the total amount of the BC, CC, and polymer binder. In some embodiments, the amount of the polymer binder present in the composite electrode composition is in a range from 5-15 wt. %, preferably 6-14 wt. %, preferably 7-13 wt. %, preferably 8-12 wt. %, and preferably 9-11 wt. % of the total amount of the BC, CC, and polymer binder. In a preferred embodiment, the amount of the polymer binder present in the composite electrode composition is 10 wt. % of the total amount of the BC, CC, and polymer binder.

In another aspect, the capacitor includes an electrolyte. Suitable examples of electrolytes for supercapacitors include aqueous solution of sodium hydroxide (NaOH), potassium hydroxide (KOH), lithium hydroxide (LiOH), barium hydroxide ($Ba(OH)_2$), calcium hydroxide ($Ca(OH)_2$), $Na_2SO_4$, sodium acetate (NaOAc), potassium acetate (KOAc), sulfuric acid ($H_2SO_4$), phosphoric acid ($H_2PO_4$), potassium carbonate ($K_2CO_3$), tetraethylammonium tetrafluoroborate (TEA-$BF_4$), lithium tetrafluoroborate ($LiBF_4$), and propylene carbonate (PC). In some embodiments, the electrolyte has a concentration of 0.05-0.5 molar (M), preferably 0.1-4.5 M, preferably 0.5-4.0 M, preferably 1.0-3.5 M, preferably 1.5-3.0 M, and preferably 2.0-2.5 M. In a preferred embodiment, the electrolyte has a concentration of 1 M. In a preferred embodiment, the electrolyte is aqueous solution of $Na_2SO_4$. The aqueous solution also includes water. The water may be tap water, distilled water, bidistilled water, deionized water, deionized distilled water, reverse osmosis water, and/or some other water. In a preferred embodiment, the water is deionized water.

Preferably, to maintain uniform concentrations and/or temperatures of the electrolyte solution, the electrolyte solution may be stirred or agitated during the step of the subjecting. The stirring or agitating may be done intermittently or continuously. This stirring or agitating may be done by a magnetic stir bar, a stirring rod, an impeller, a shaking platform, a pump, a sonicator, a gas bubbler, or some other device. Preferably the stirring is done by an impeller or a magnetic stir bar.

In another aspect, the capacitor includes a separator. A suitable separator for an electrolyte should have high moisture retention ability and low resistance to electrolyte ion transfer. The separator further assists ionic conduction through the electrolyte, allowing the flow of charged ions during the passage of current. Suitable examples of separator includes a polyethylene separator, a polypropylene separator, and a polyvinyl chloride (PVC) separator, glass fibers, polyester, Teflon, polytetrafluoroethylene (PTFE), and combinations thereof.

In some embodiments, the specific capacitance of the composite electrode composition is greater than or equal to 150 farads per gram (F/g), preferably 155 F/g, preferably 160 F/g, preferably 165 F/g, preferably 170 F/g, preferably 175 F/g, preferably 180 F/g, preferably 185 F/g, preferably 190 F/g, preferably 195 F/g, and preferably 200 F/g, measured at 1 millivolt per second (mV/sec). In some embodiments, the specific capacitance of the composite electrode composition is greater than or equal to 170 F/g, preferably 175 F/g, preferably 180 F/g, preferably 185 F/g, preferably 190 F/g, preferably 195 F/g, and preferably 200 F/g, measured at 1 mV/s. In some embodiments, the specific capacitance of the composite electrode composition is greater than or equal to 190 F/g, preferably 191 F/g, preferably 192 F/g, preferably 193 F/g, preferably 194 F/g, preferably 195 F/g, preferably 196 F/g, preferably 197 F/g, preferably 198 F/g, preferably 199 F/g, and preferably 200 F/g measured at 1 mV/s.

In some embodiments, the specific capacitance of the composite electrode composition is greater than or equal to 180 F/g, preferably 185 F/g, preferably 190 F/g, preferably 195 F/g, and preferably 200 F/g, measured after 2000 applied cycles in a coin cell. In some embodiments, the specific capacitance of the composite electrode composition is greater than or equal to 150 F/g, preferably 155 F/g, preferably 160 F/g, preferably 165 F/g, preferably 170 F/g, preferably 175 F/g, preferably 180 F/g, preferably 185 F/g, preferably 190 F/g, preferably 195 F/g, and preferably 200 F/g, measured after 4000 applied cycles in a coin cell. In some embodiments, the specific capacitance of the composite electrode composition is greater than or equal to 130 F/g, preferably 135 F/g, preferably 140 F/g, preferably 145 F/g, preferably 150 F/g, preferably 155 F/g, preferably 160 F/g, preferably 165 F/g, preferably 170 F/g, preferably 175 F/g, preferably 180 F/g, preferably 185 F/g, preferably 190 F/g, preferably 195 F/g, and preferably 200 F/g, measured after 5000 applied cycles in a coin cell.

EXAMPLES

The following examples demonstrate a zinc-vanadium-nickel oxide ($ZnV_2O_4/NiO$) and biochar (BC)-based supercapacitor (ZNV@BC). The examples are provided solely for illustration and are not to be construed as limitations of the present disclosure, as many variations thereof are possible without departing from the spirit and scope of the present disclosure.

Example 1: Materials

Zinc sulfate heptahydrate ($ZnSO_4 \cdot 7H_2O$), nickel (III) nitrate ($NiNO_3 \cdot 6H_2O$), ammonium vanadate ($NH_4VO_3$), urea ($NH_2CONH_2$), and nitric acid ($HNO_3$) were obtained from Sigma Aldrich, whereas 1-methyl-2-pyrrolidone (NMP) was procured from Merck. Conductive carbon (CC), HSV 900 PVDF (polyvinylidene fluoride) binder were obtained from MTI (USA).

Example 2: Preparation of Biochar

Vegetable waste from households was gathered from a waste bin in Dammam to make biochar. Fruits and vegetables were collected from a nearby grocery store. Following collection, the edible parts of the leaves, fruit peels, and fruit seeds were combined for use as feedstock. The wastes were carefully washed several times with distilled water to remove impurities. After batch separation, the vegetable wastes were sliced into small portions (<8 mm). The waste was then dried completely at 75 degrees Celsius (° C.) in a drying oven, and the weight of the dried biomass was determined. Approximately 10 grams (g) of the precursor material was placed in a cylindrical stainless-steel tube and heated to 850° C. for 2 hours. After cooling for an additional 2 hours the biochar was crushed and sieved to a size range of 100 to 500 micrometers (μm). The yield of biochar produced ranged from 18% to 20%, depending on the pyrolysis conditions (biochar, temperature, and duration). The biochar samples were stored in airtight glass vials for testing and further use. There was no need for purification, as all chemicals used were of the highest analytical grade.

Example 3: Preparation of Zinc Vanadium Nickel Oxide (ZNV)

Vanadium oxide ($V_2O_5$) was synthesized by adding 1 g of $NH_4VO_3$ to a reaction vessel and heating at 400° C. for 2 h, then adding nitric acid ($HNO_3$) and vigorously stirring for 24 h. The resulting $V_2O_5$ powder was washed with deionized water. To prepare the ZNV nanocomposite, 1 millimole (mmol) of $ZnSO_4 \cdot 7H_2O$ and 1 mmol of $Ni(NO_3)_2 \cdot 6H_2O$ were dissolved separately in 15 milliliters (mL) of deionized water. The prepared $V_2O_5$ (0.5 g) was then added to the solution. After vigorous stirring for 30 min, the solution was transferred into a 100 mL Teflon-lined stainless-steel autoclave and heated at 180° C. for 24 h using a hydrothermal method. The final precipitate was collected and washed with deionized water and ethanol, then dried at 80° C. overnight. The final product was calcined at 600° C. for 2 h, referred to as ZNV.

Example 4: Preparation of ZNV@BC Slurry

The ground biochar (BC) was blended with CC and binder polymer polyvinylidene fluoride (PVDF) using a mortar and pestle. The percentage weights of the pristine materials BC-CC-PVDF (80%-10%-10%) were based on the total weight (0.5 g). For the nanomaterial composite (ZNV), the percentage weights (7%-10%-15%) were calculated from the total weight of the BC-CC-PVDF mixture (0.5 g). The blending of the pristine material and/or nanomaterial composites was stirred at 80° C. for 1 h to form a homogeneous viscous slurry.

Example 5: Materials Characterization

The morphology of the obtained materials was observed using scanning electron microscopy (SEM) (TESCAN VEGA3) and transmission electron microscopy (TEM) (Morgagni 268). Energy-dispersive X-ray spectroscopy (EDX) measurements were conducted with an EDAX detector. The specific surface area, pore size, and pore volume of the materials were analyzed by Brunauer-Emmett-Teller (BET) using an ASAP 2020 PLUS (Micromeritics, USA). X-ray diffraction (XRD) (Shimadzu XRD-7000) with monochromatic high-intensity Cu Kα radiation (λ=1.5406 Å) was employed to investigate the crystalline structure of the samples in the 2θ range of 5-80 degrees (°), with a scan rate of 0.5 degrees per minute (°/min). Functional groups in the materials were identified through Fourier-transform infrared (FTIR) spectroscopy (Perkin Elmer Spectrum Two) in the range of 450-4000 $cm^{-1}$. Thermogravimetric analysis (TGA) was conducted using a simultaneous thermal analyzer (STA6000, PerkinElmer, Ohio, USA), with a temperature rise from 25° C. to 600° C. at a heating rate of 10° C./min.

Example 6: Assembly of Electrodes

Electrochemical measurements were performed in a three-electrode cell, with a platinum (Pt) wire as the reference electrode and carbon for the other electrodes. The working electrode was coated with the ZNV@BC slurry, followed by thermal treatment in a furnace at 80° C. to remove all solvents and polymer. The difference in mass of the working electrode before and after annealing was used to calculate the weight of the ZNV@BC material. Capacitance was then calculated in Farads. For flexibility tests, the ZNV@BC slurry was cast onto aluminum foil (current collector) and dried at 80° C. in a furnace.

Example 7: Electrochemical Measurements

The electrochemical performance was assessed using a Corrtest electrochemical workstation (CS1034) in both three-electrode and two-electrode configurations. The following electrochemical techniques were employed: cyclic voltammetry (CV), galvanostatic charge/discharge (GCD), and electrochemical impedance spectroscopy (EIS). In CV, a potential change was applied at a fixed scan rate to generate a current response, with the window voltage ranging from 0 volts (V) to 0.8 V using a 1 molar (M) $Na_2SO_4$ electrolyte for three-electrode measurements. The scan rates were 1, 5, 7, and 10 millivolts per second (mV/s). GCD was performed by applying constant current charge and discharge cycles, with currents ranging from 0.25 milliamperes (mA) to 5 mA, up to the maximum voltage of 0.8 V for 500 cycles. EIS was measured over a frequency range of 0.01 hertz (Hz) to 100 kilohertz (kHz) with a 10 mV sine wave perturbation. Lota and research group [See: Lota, K., et al., 2013, Effect of aqueous electrolytes on electrochemical capacitor capacitance, *Chemik,* 67, 1138-1145] reported although strong acid (sulfuric acid) and strong base (potassium hydroxide (KOH)) electrolyte solutions have the highest conductivity, their capacitance performance on activated carbon (AC) electrodes shows lower performance compared to the aqueous neutral electrolyte as in sodium sulfate for the same window voltage (0.8 V). $Na_2SO_4$ is a great candidate to use as an electrolyte in carbon materials.

Figure 1B:
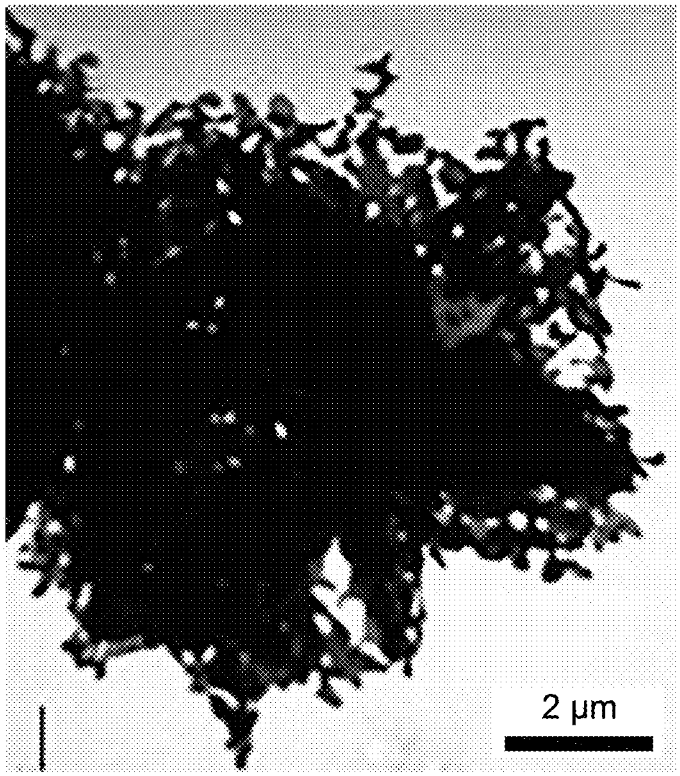
FIG. 1B shows a transmission electron microscopic (TEM) image of the ZNV composite, according to certain embodiments.
Figure 1C:
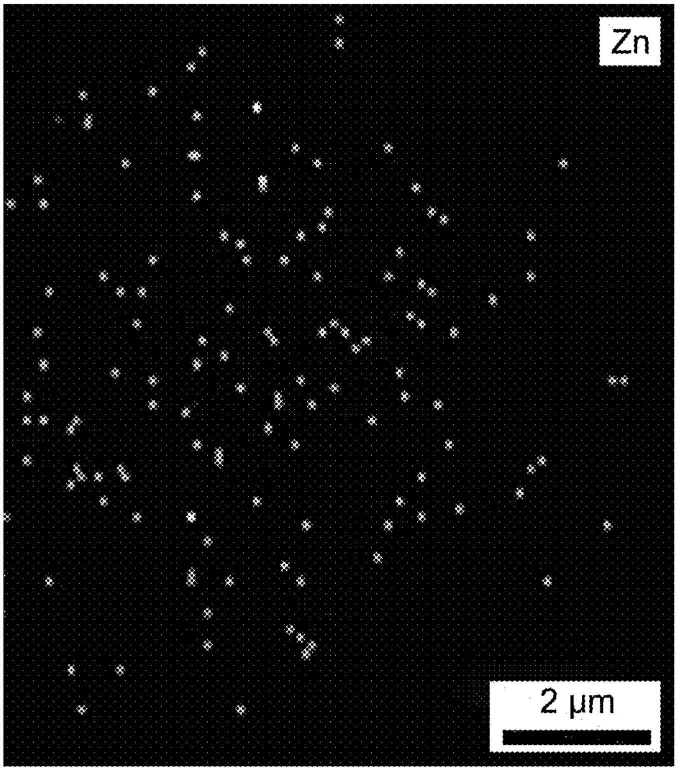
FIG. 1C shows an energy dispersive X-ray spectroscopic (EDX) elemental mapping image of the ZNV composite showing zinc (Zn), according to certain embodiments.
Figure 1D:
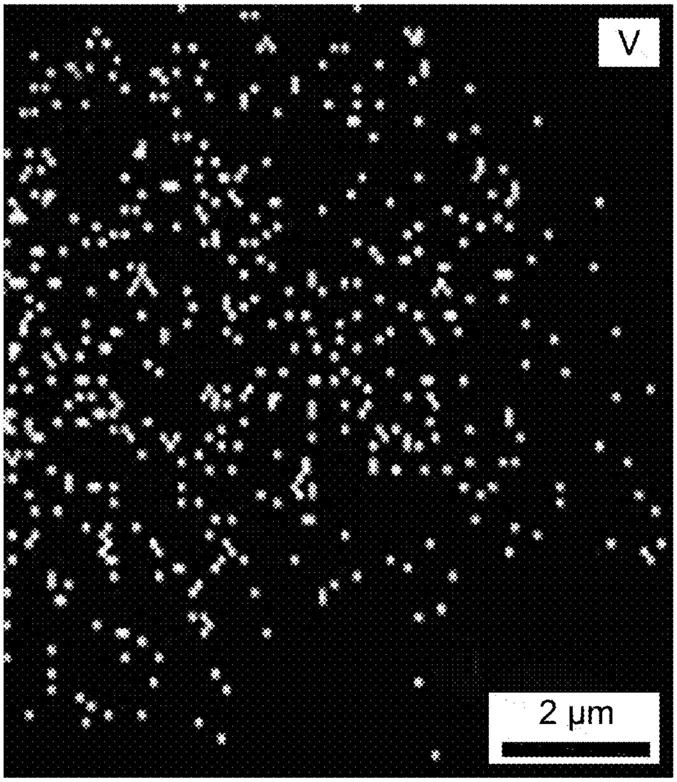
FIG. 1D shows an EDX elemental mapping image of the ZNV composite showing vanadium (V), according to certain embodiments.
Figure 1E:
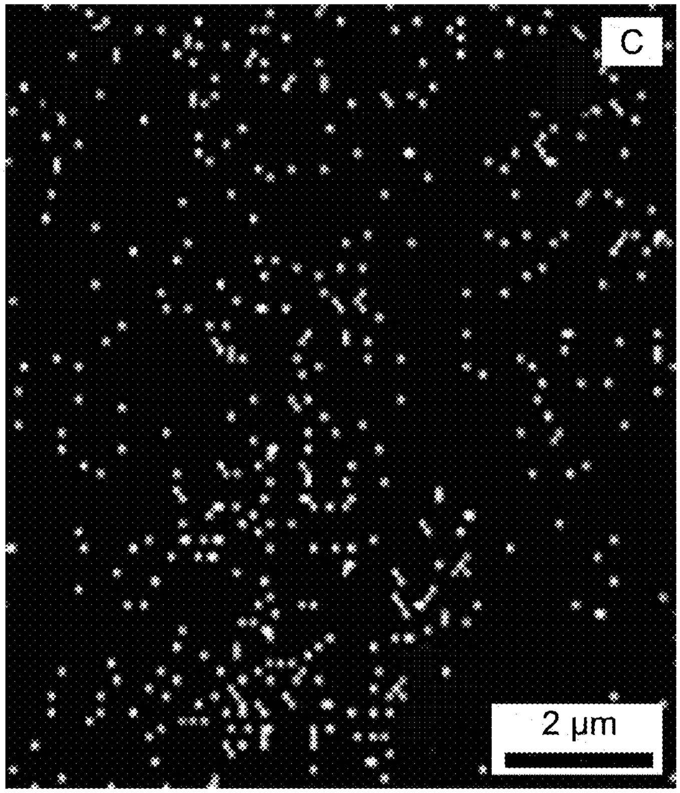
FIG. 1E shows an EDX elemental mapping image of the ZNV composite showing carbon (C), according to certain embodiments.
Figure 1F:
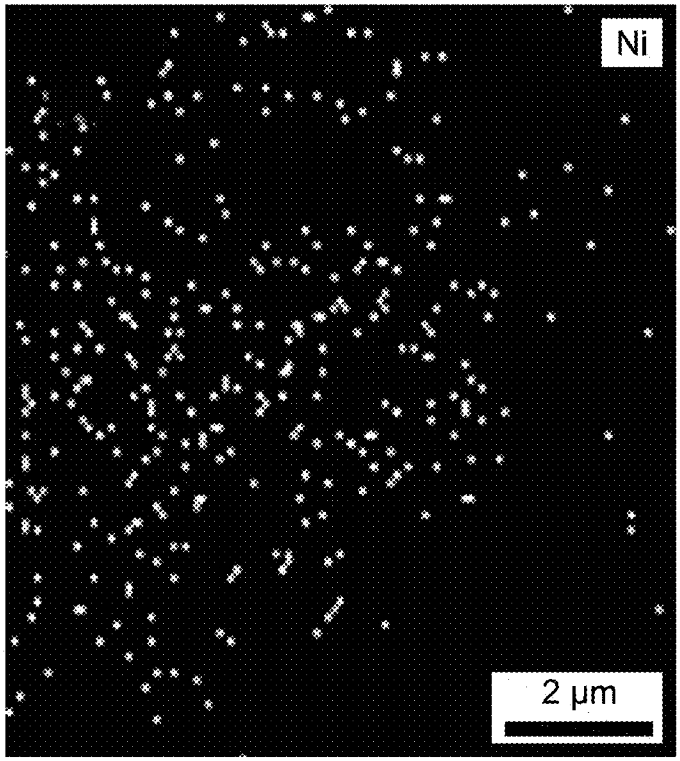
FIG. 1F shows an EDX elemental mapping image of the ZNV composite showing nickel (Ni), according to certain embodiments.
Figure 1G:
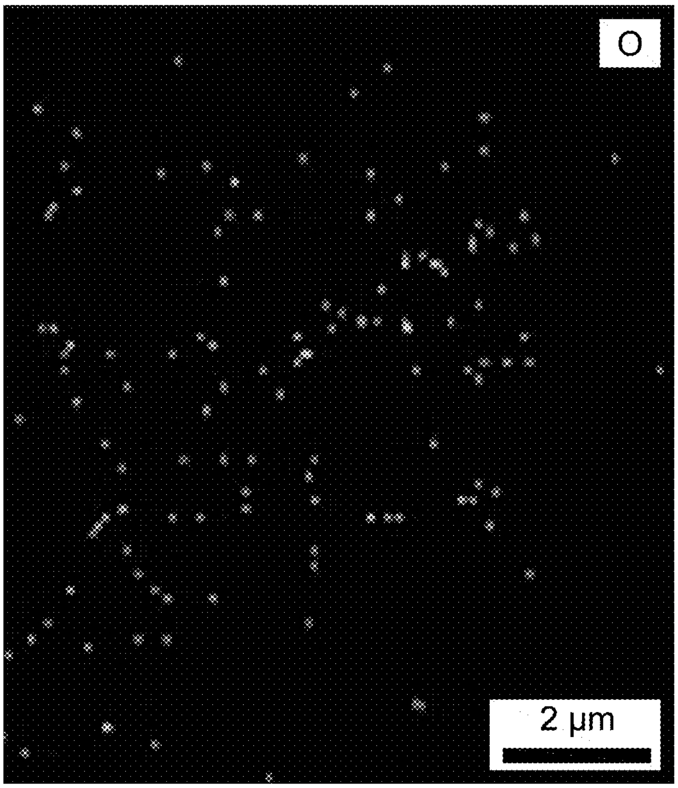
FIG. 1G shows an EDX elemental mapping image of the ZNV composite showing oxygen (O), according to certain embodiments.
Figure 2A:
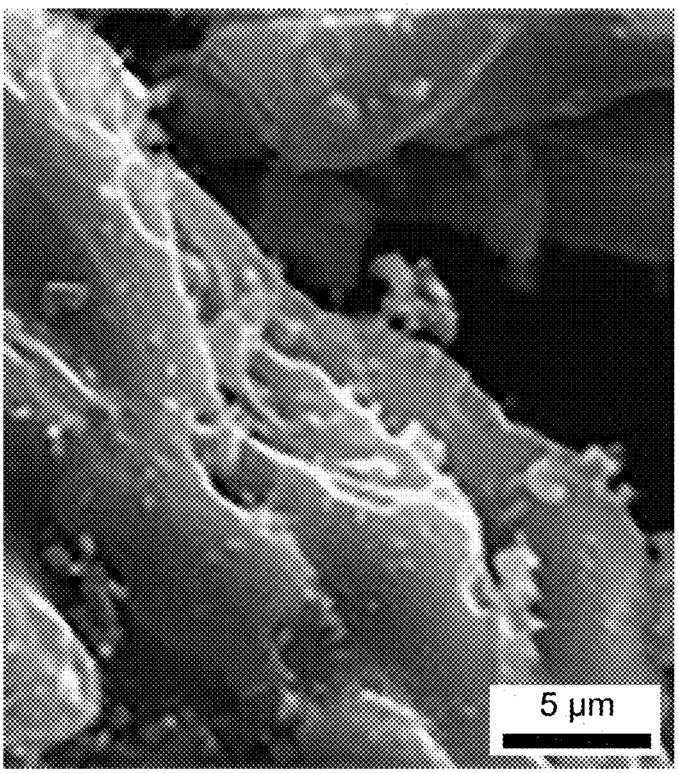
FIG. 2A shows a SEM image of a biochar (BC), according to certain embodiments.
Figure 2B:
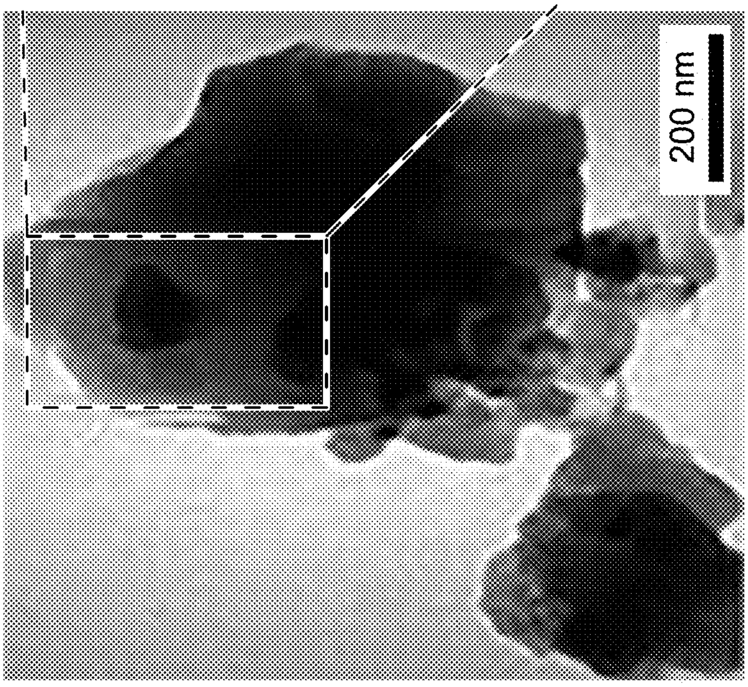
FIG. 2B shows a TEM image of the BC at 200 nm, according to certain embodiments.
Figure 2C:
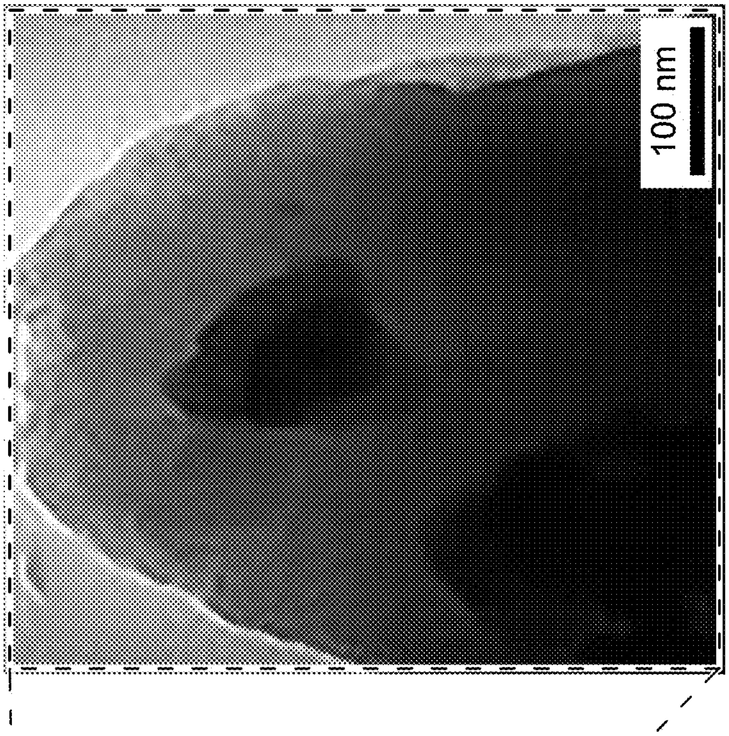
FIG. 2C shows a TEM image of the BC at 100 nm, according to certain embodiments.
Figure 2D:
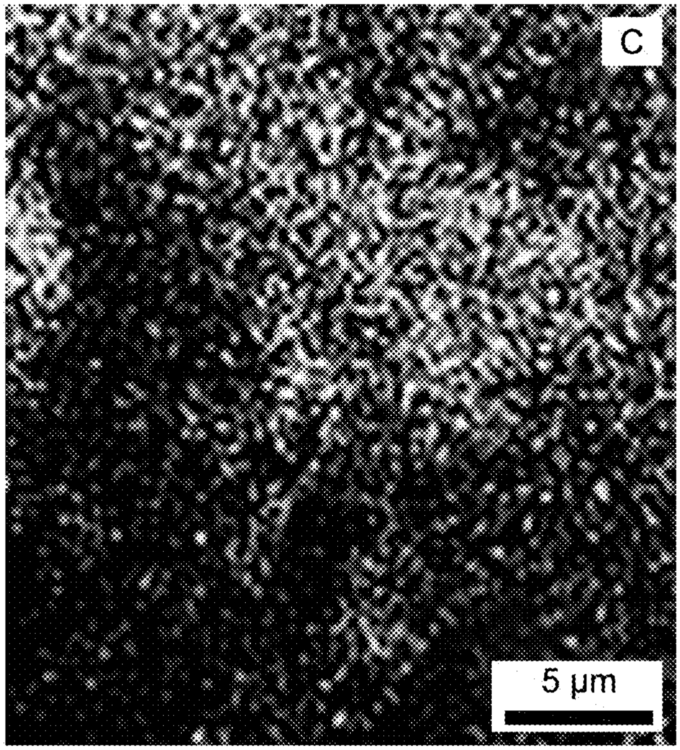
FIG. 2D shows an EDX elemental mapping image of the BC showing C, according to certain embodiments.
Figure 2E:
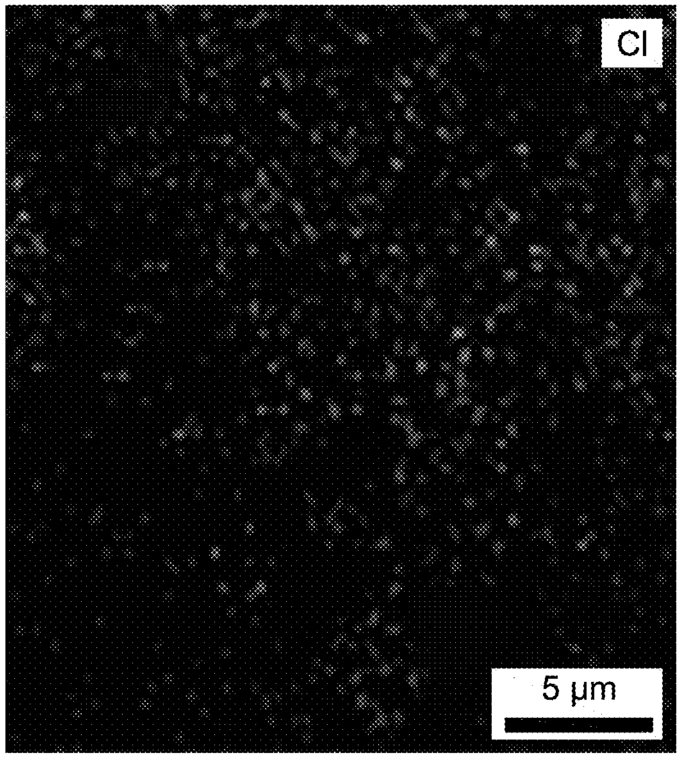
FIG. 2E shows an EDX elemental mapping image of the BC showing chlorine (Cl), according to certain embodiments.
Figure 2F:
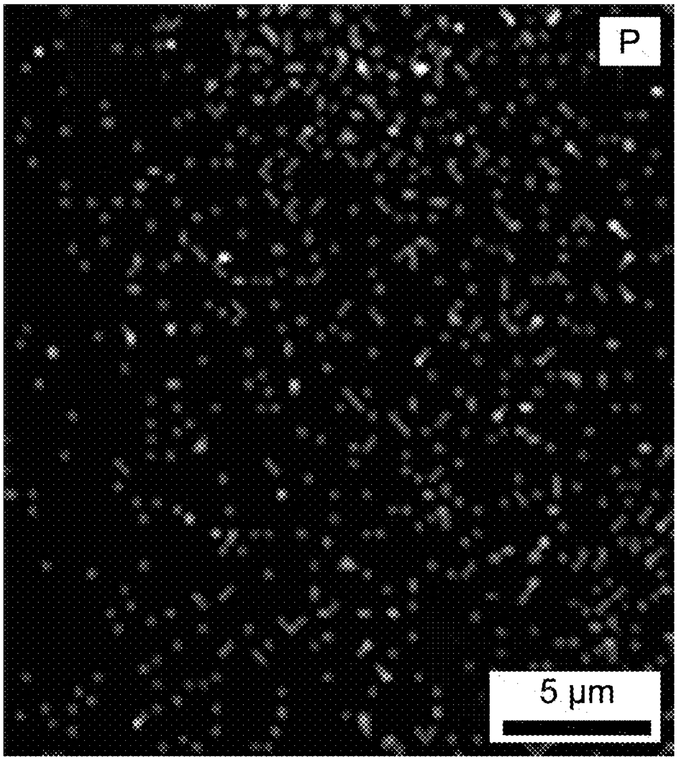
FIG. 2F shows an EDX elemental mapping image of the BC showing phosphorous (P), according to certain embodiments.
Figure 2G:
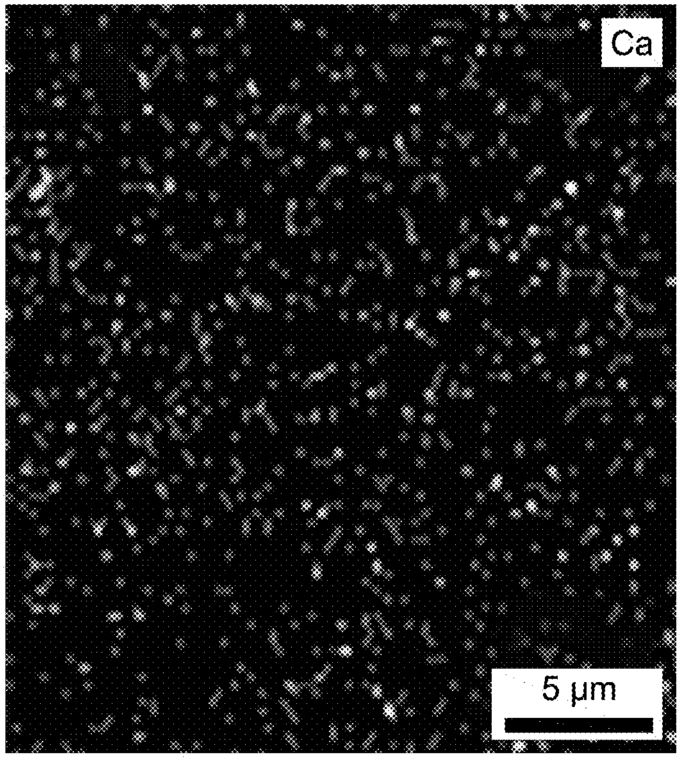
FIG. 2G shows an EDX elemental mapping image of the BC showing calcium (Ca), according to certain embodiments.
Figure 2H:
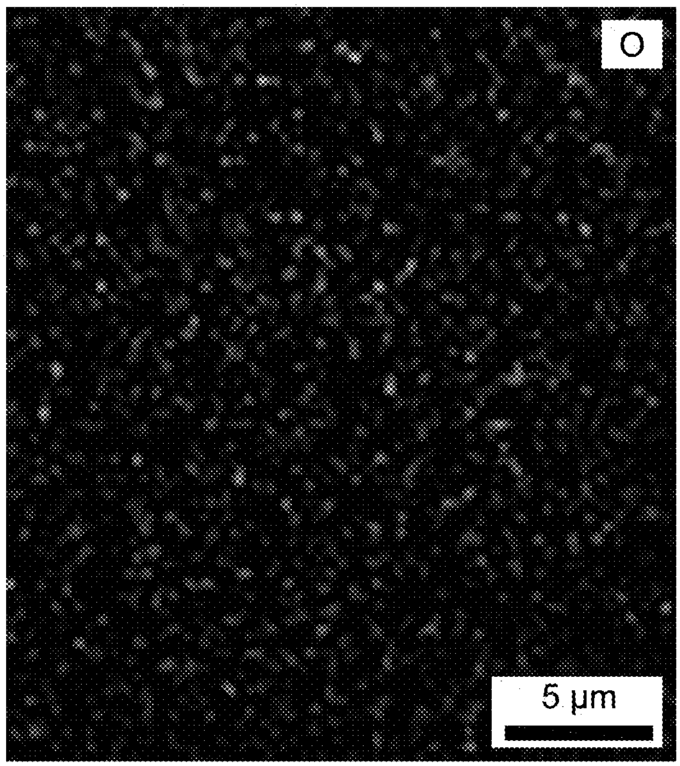
FIG. 2H shows an EDX elemental mapping image of the BC showing O, according to certain embodiments.
Figure 2I:
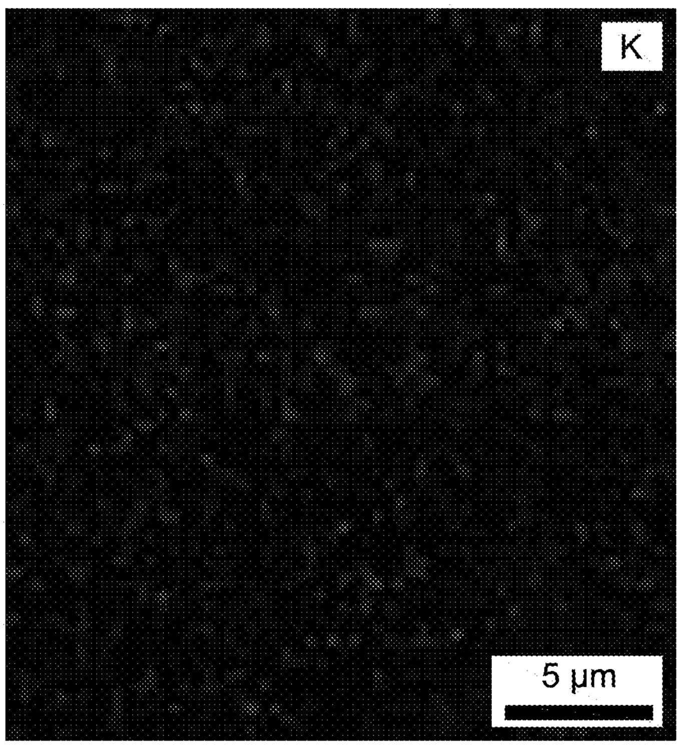
FIG. 2I shows an EDX elemental mapping image of the BC showing potassium (K), according to certain embodiments.
Figure 3A:
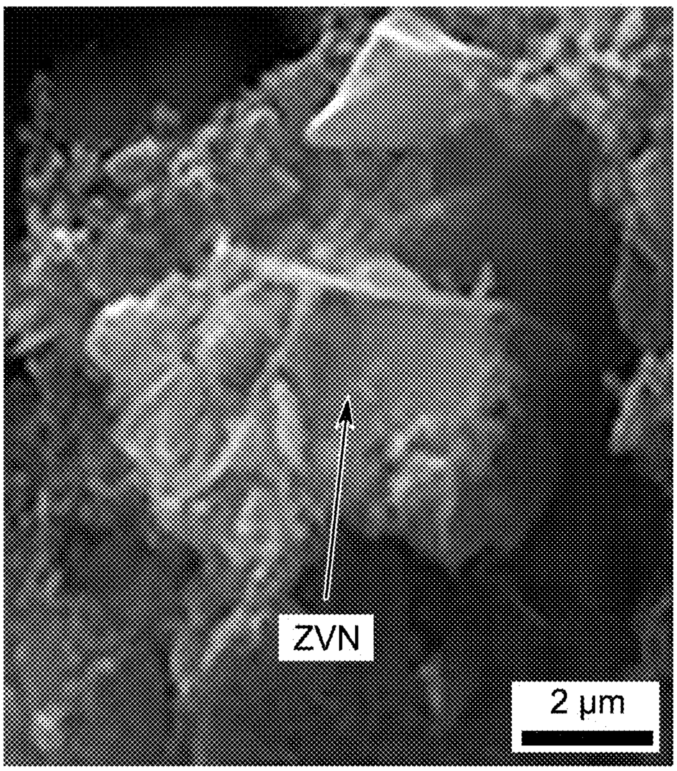
FIG. 3A shows a SEM image of a zinc-vanadium-nickel oxide and biochar-nanocomposite (ZNV@BC), according to certain embodiments.
Figure 3B:
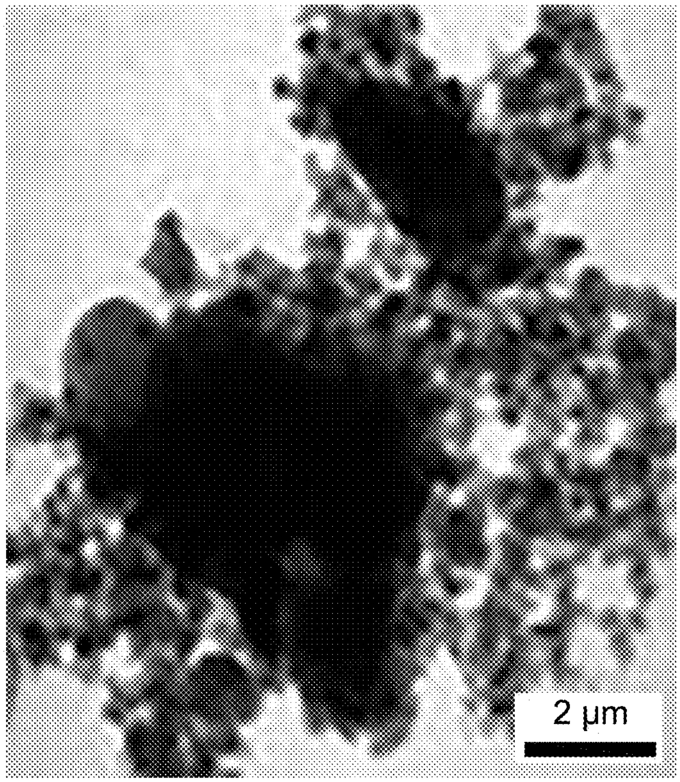
FIG. 3B shows a TEM image of the ZNV@BC nanocomposite, according to certain embodiments.
Figure 3C:
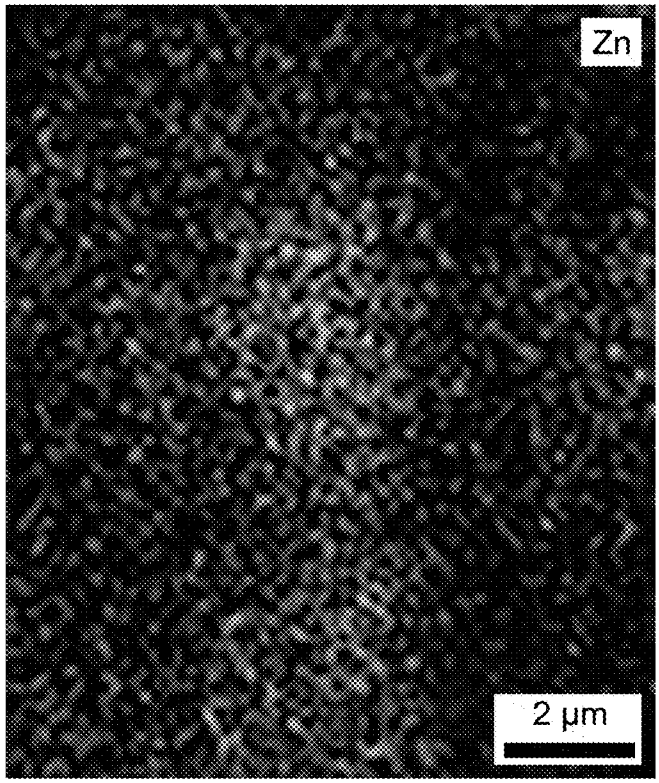
FIG. 3C shows an EDX elemental mapping image of the ZNV@BC nanocomposite showing Zn, according to certain embodiments.
Figure 3D:
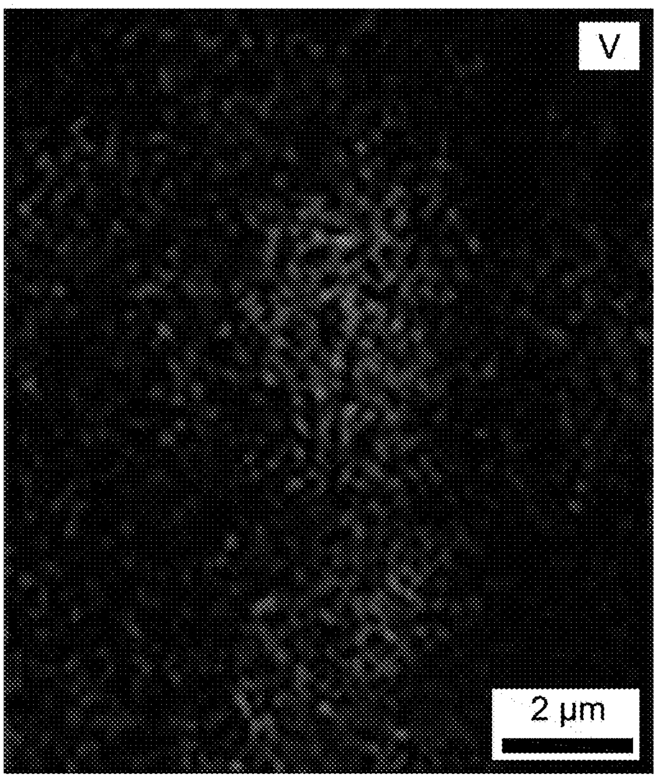
FIG. 3D shows an EDX elemental mapping image of the ZNV@BC nanocomposite showing V, according to certain embodiments.
Figure 3E:
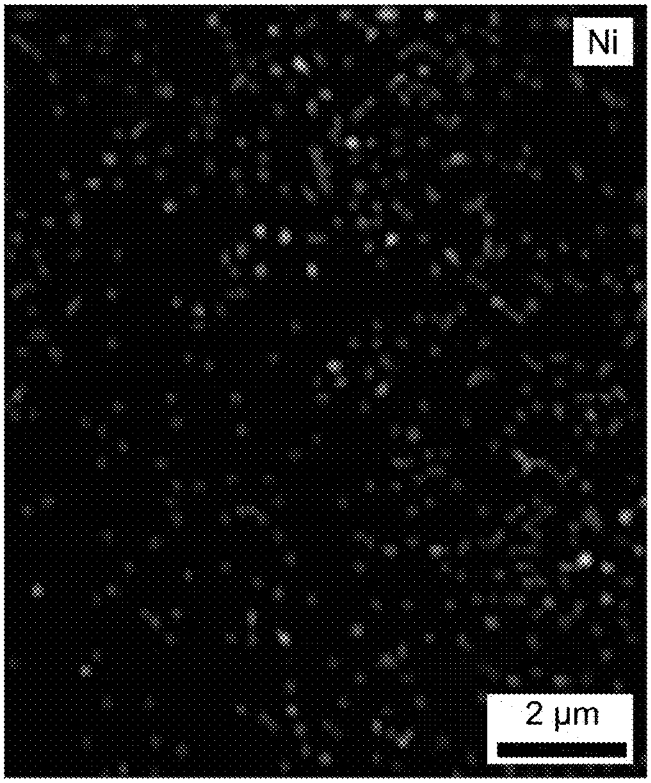
FIG. 3E shows an EDX elemental mapping image of the ZNV@BC nanocomposite showing Ni, according to certain embodiments.
Figure 3F:
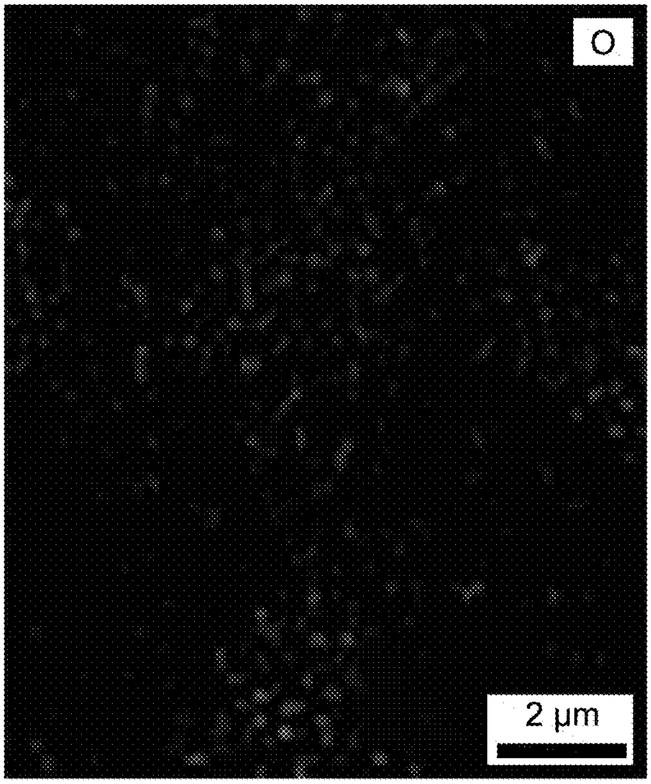
FIG. 3F shows an EDX elemental mapping image of the ZNV@BC nanocomposite showing O, according to certain embodiments.
Figure 3G:
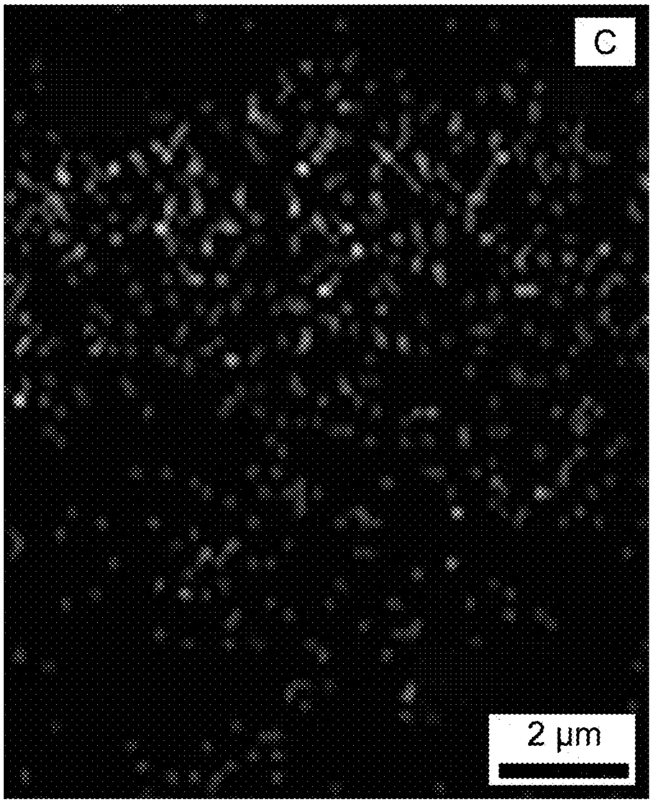
FIG. 3G shows an EDX elemental mapping image of the ZNV@BC nanocomposite showing C, according to certain embodiments.
Figure 3H:
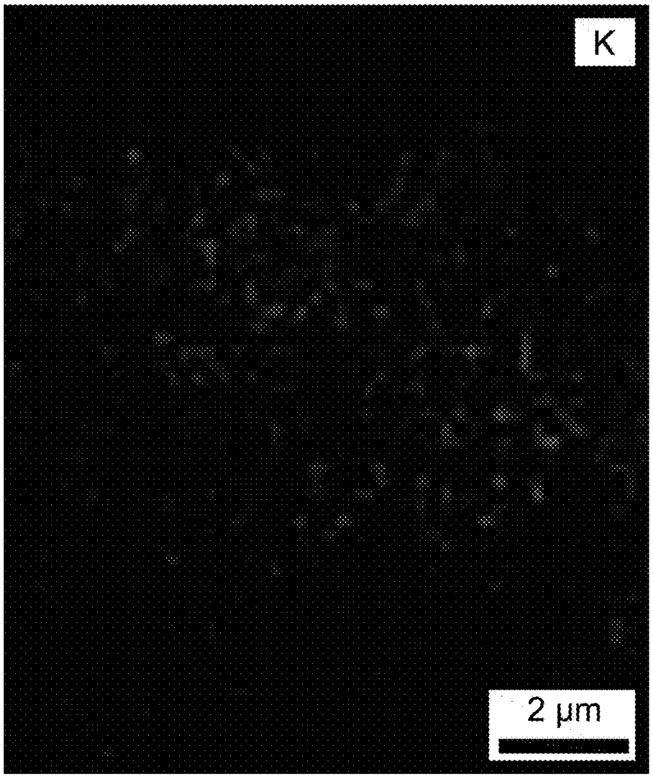
FIG. 3H shows an EDX elemental mapping image of the ZNV@BC nanocomposite showing K, according to certain embodiments.
Figure 3I:
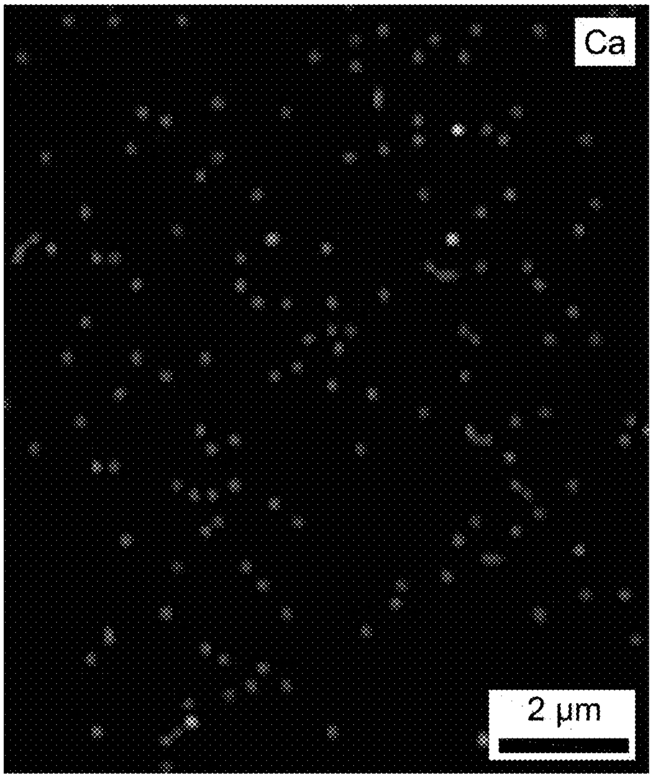
FIG. 3I shows an EDX elemental mapping image of the ZNV@BC nanocomposite showing Ca, according to certain embodiments.
Figure 3J:
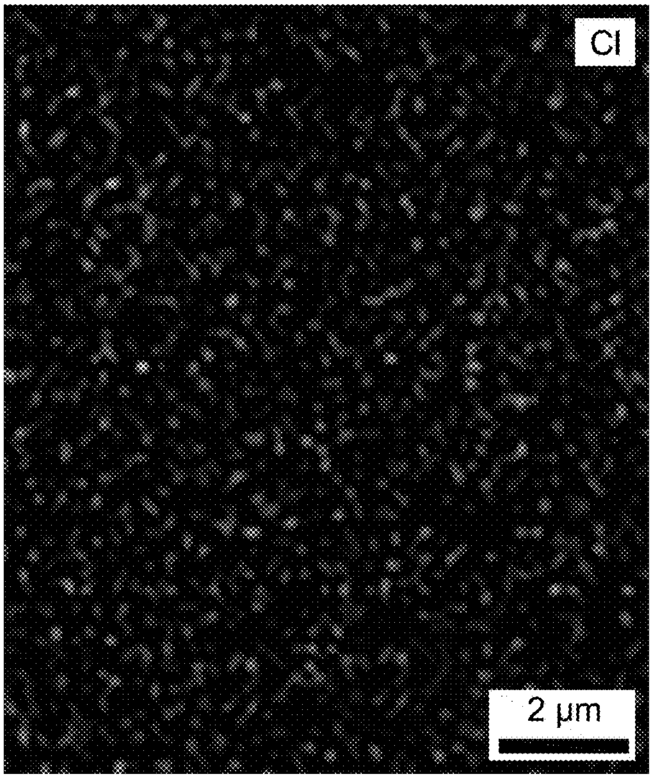
FIG. 3J shows an EDX elemental mapping image of the ZNV@BC nanocomposite showing Cl, according to certain embodiments.
Figure 3K:
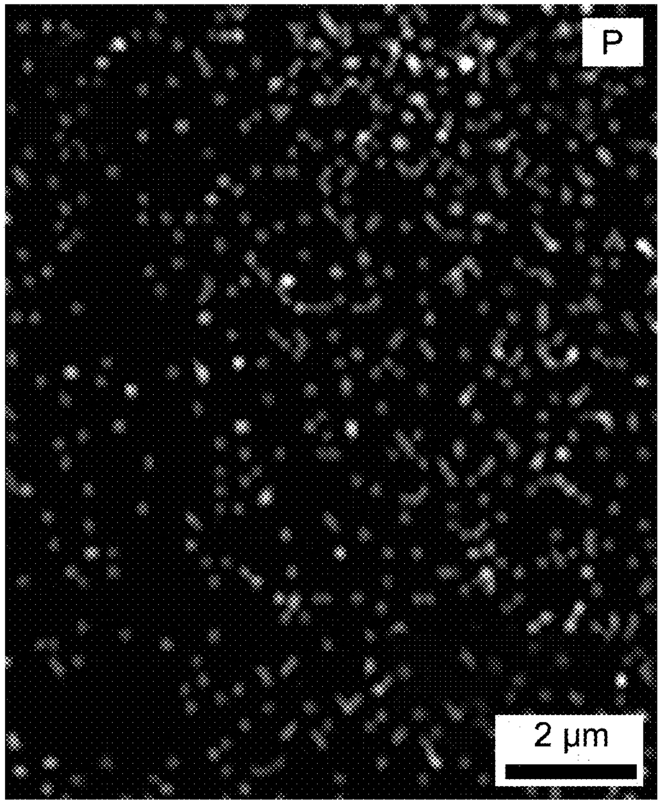
FIG. 3K shows an EDX elemental mapping image of the ZNV@BC nanocomposite showing P, according to certain embodiments.

The morphology of the as-prepared ZNV was observed through SEM (FIG. 1A) and TEM (FIG. 1B). Two-dimensional flower-like particles are formed with a diameter of approximately 5 μm. FIGS. 1C-1H shows elemental analysis through EDX and elemental mapping showing the uniform distribution of zinc (Zn), vanadium (V), carbon (C), nickel (Ni), and oxygen (O) elements, respectively. Carbon element appears due to the carbon background of the specimen grid. FIG. 2A shows a SEM image of BC and FIGS. 2B-2C shows TEM images of powdered BC, which show irregular flakes and rough surface morphology resulting from the grinding process. Elemental images in FIGS. 2D-2I show that BC contains, C, chlorine (Cl), phosphorus (P) and calcium (Ca), O, and potassium (K), respectively, as revealed by EDX analysis. Furthermore, SEM (FIG. 3A) and TEM images (FIG. 3B) of the ZNV@BC nanocomposite exhibited a complex morphology with flower-like ZNV particles aggregated with CC and BC, with additional pores on the carbonaceous surface. EDX elemental mapping confirmed the presence of Zn, Ni, V, O, C, K, Cl, P, and Ca.

Figure 4A:
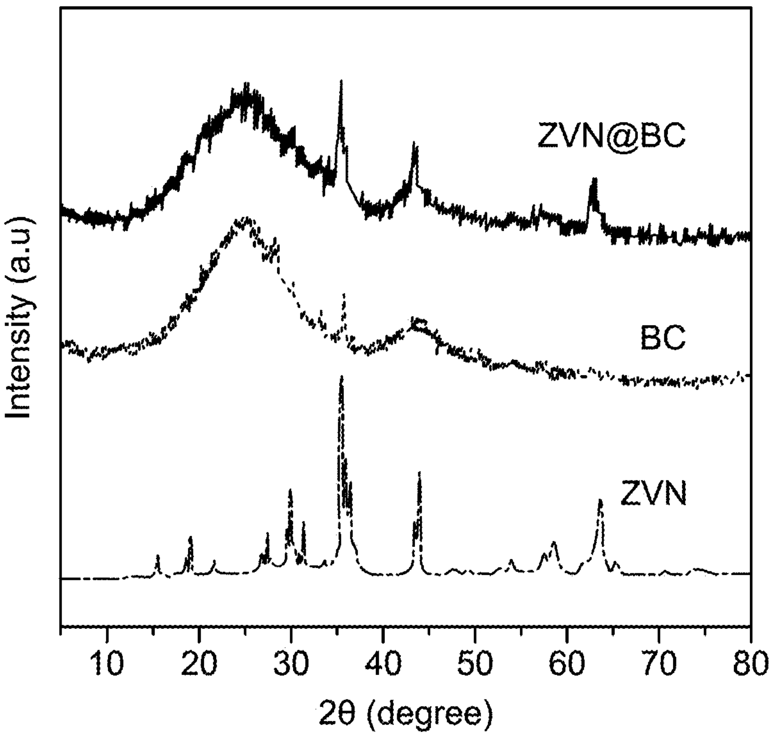
FIG. 4A shows X-ray diffraction (XRD) patterns for ZNV, BC, and ZNV@BC nanocomposite, according to certain embodiments.

FIG. 4A shows XRD patterns for ZNV, BC, and ZNV@BC nanocomposite. The XRD pattern of ZNV revealed a two-phase structure, with $ZnV_2O_4$ (JCPDS No. 75-0318) and NiO (JCPDS No. 47-1049). Peaks at 18.7°, 35.5°, 58.4°, and 63.6° correspond to the (111), (311), (422), and (511) crystal planes of $ZnV_2O_4$, and peaks at 43.7°, 63.5°, and 74.2° correspond to the (200), (220), and (311) planes of NiO. For BC, two broad peaks at 2θ values of 25.15° and 43.65° correspond to the graphitic carbon planes (002 and 100), characteristic of the hybridization of carbon atoms during pyrolysis. The XRD pattern of ZNV@BC showed a combination of BC and ZNV peaks.

Figure 4B:
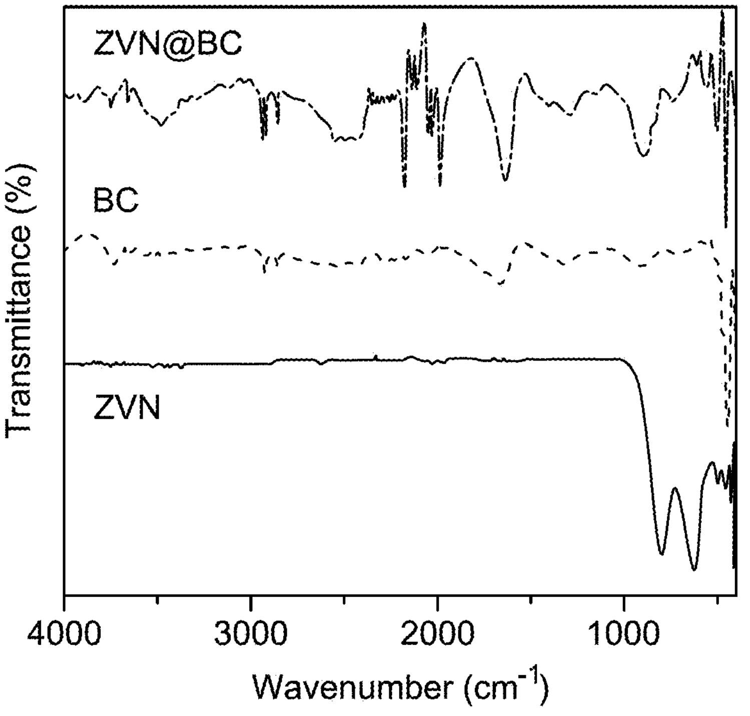
FIG. 4B shows Fourier-transform infrared (FTIR) spectra for ZNV, BC, and ZNV@BC nanocomposite, according to certain embodiments.

FIG. 4B shows FTIR spectra for ZNV, BC, and ZNV@BC nanocomposite. FTIR spectra of ZNV showed intense peaks at 803 centimeters inverse ($cm^{-1}$) and 629 $cm^{-1}$, corresponding to the bending vibrations of metal-oxide bonds. The BC spectrum showed peaks at 3712 $cm^{-1}$ (O—H stretching) and 2931 $cm^{-1}$ (C—H stretching), with additional strong peaks at 1620 $cm^{-1}$ (C═C stretching) and 411 $cm^{-1}$ (metal-oxide bonds). In the ZNV@BC composite, the O—H and C═C peaks shifted to lower wavenumbers (3490 and 1606 $cm^{-1}$), and other peaks strengthened.

Figure 4C:
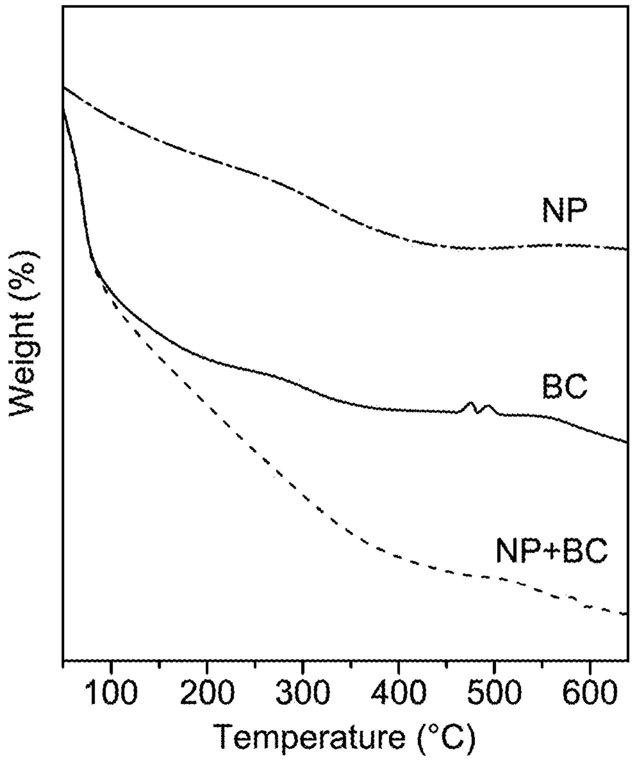
FIG. 4C shows thermogravimetric analysis (TGA) of ZNV, BC, and ZNV@BC nanocomposite, according to certain embodiments.
Figure 5A:
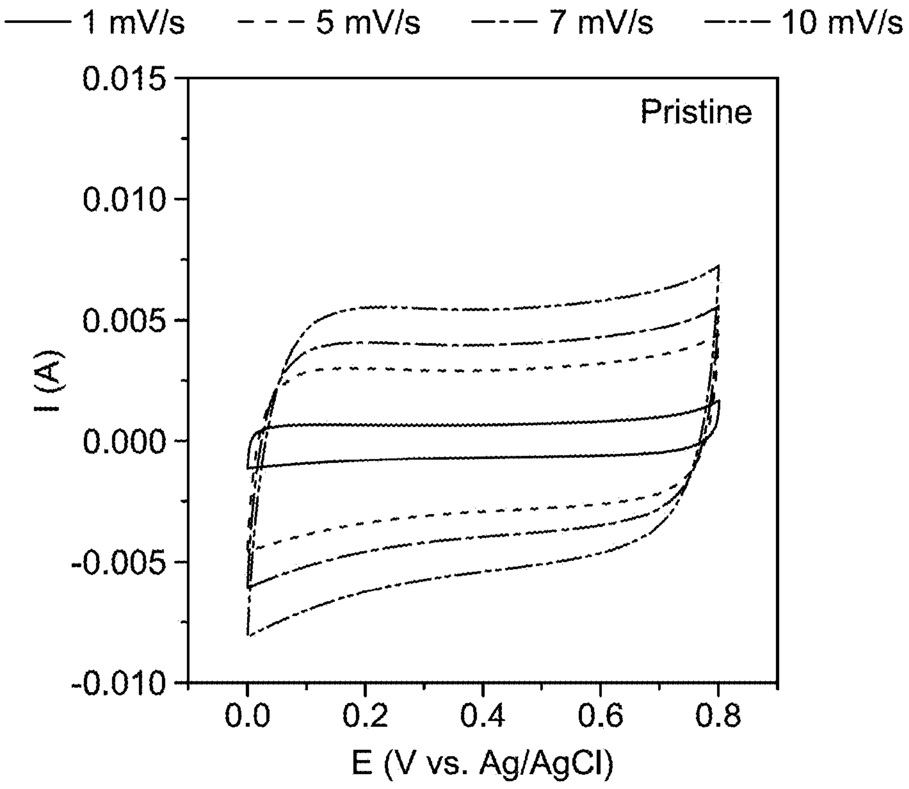
FIG. 5A shows cyclic voltametric (CV) curves for pristine BC-CC-PVDF, according to certain embodiments.
Figure 5B:
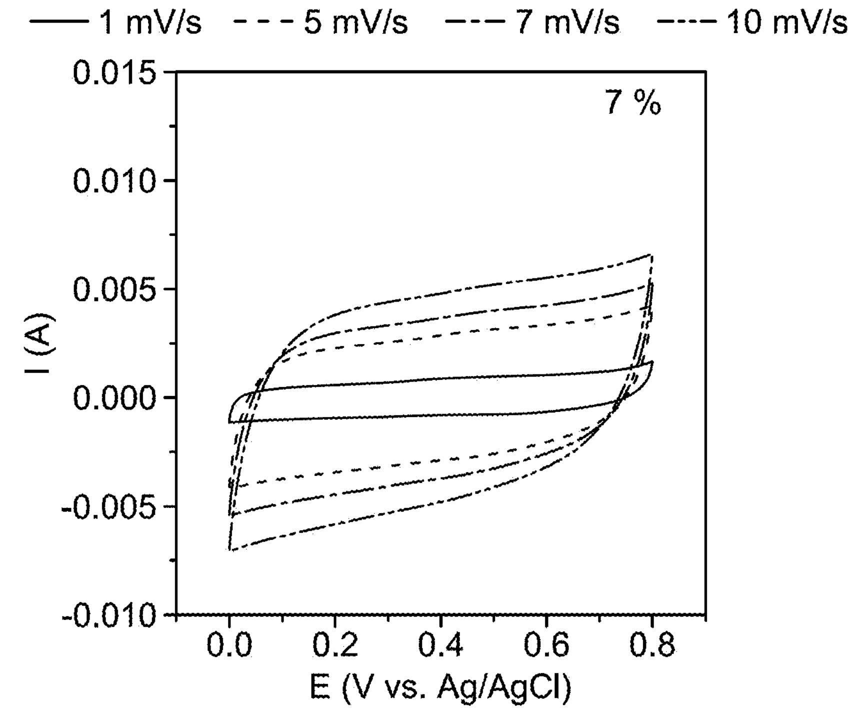
FIG. 5B shows CV curves for 7% ZNV@BC nanocomposite, according to certain embodiments.
Figure 5C:
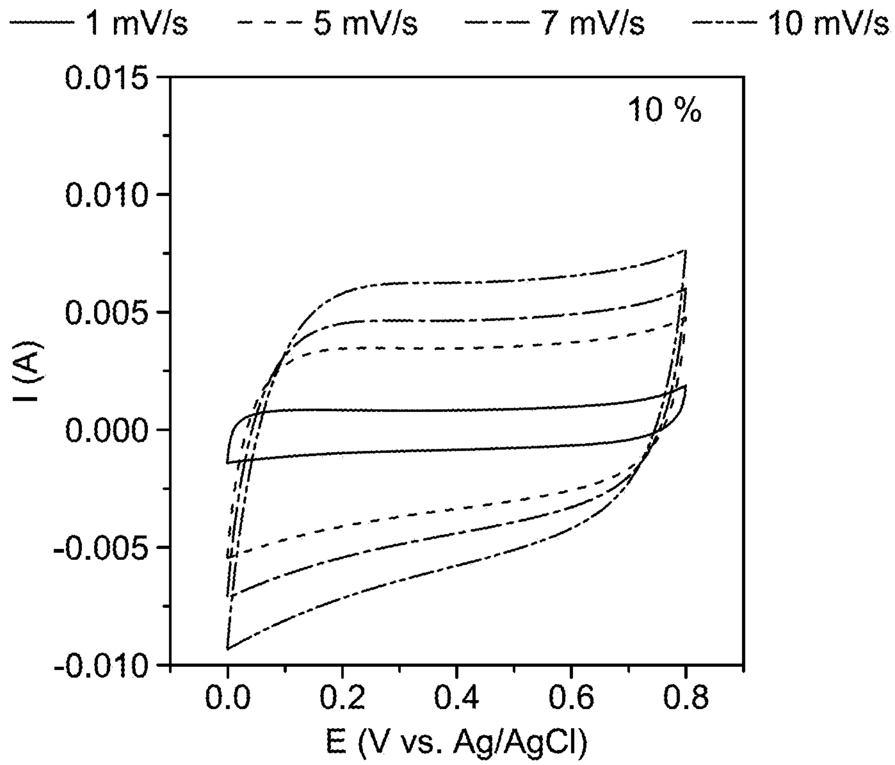
FIG. 5C shows CV curves for 10% ZNV@BC nanocomposite, according to certain embodiments.
Figure 5D:
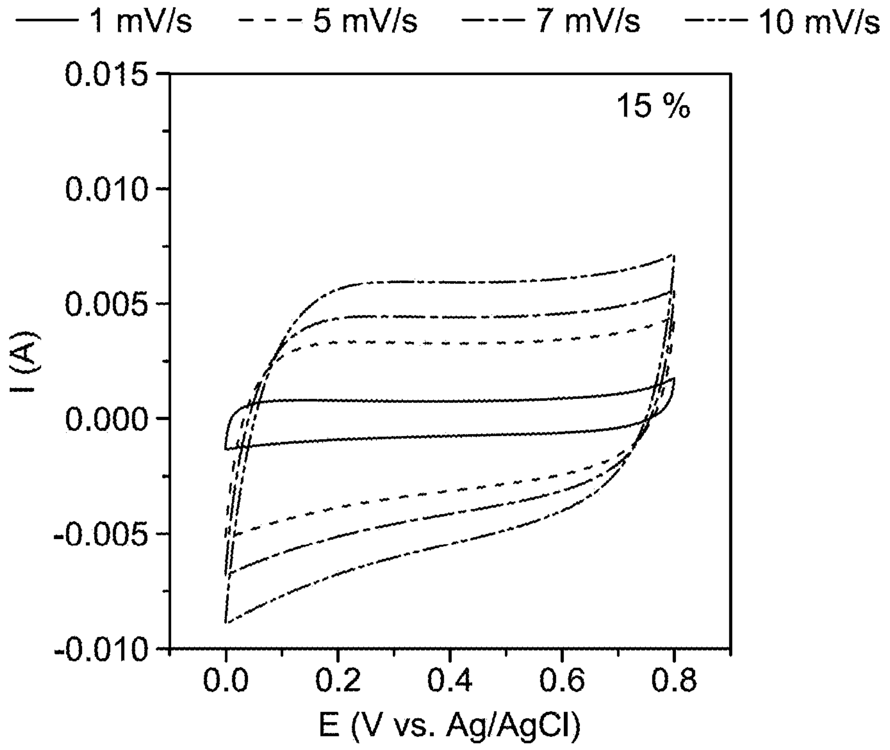
FIG. 5D shows CV curves for 15% ZNV@BC nanocomposite, according to certain embodiments.

FIG. 4C shows a plot for TGA analysis of ZNV, BC, and ZNV@BC nanocomposite. The TGA curves showed distinct thermal behavior. BC exhibited two main weight loss stages: a minor loss (~10.5%) at 80-120° C., corresponding to adsorbed water and volatile substances, and a reduction at higher temperatures due to combustion of the carbon phase. ZNV showed a negligible weight loss (~3%) up to 130° C., while ZNV@BC showed a 10.5% weight loss. The final weight losses at 650° C. were 25% for BC, 7% for ZNV, and 15% for ZNV@BC, indicating the proportion of the organic biochar phase in the composite.

Figure 6A:
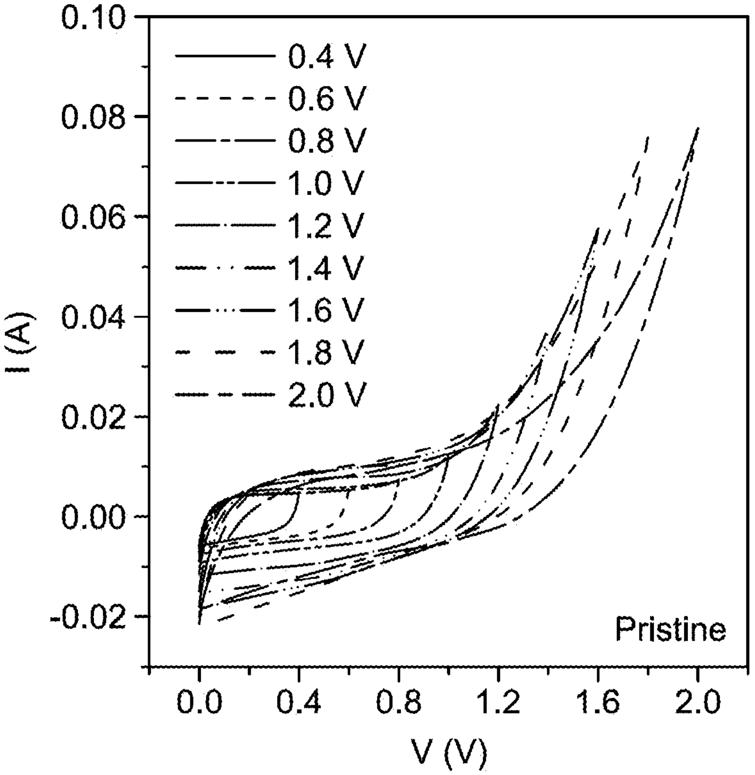
FIG. 6A shows an effect of applying various voltages ranging from 0.4 to 2.0 volts (V) for sodium sulfate ($Na_2SO_4$) electrolyte measured at 10 millivolts per second (mV/s) for pristine BC-CC-PVDF, according to certain embodiments.
Figure 6B:
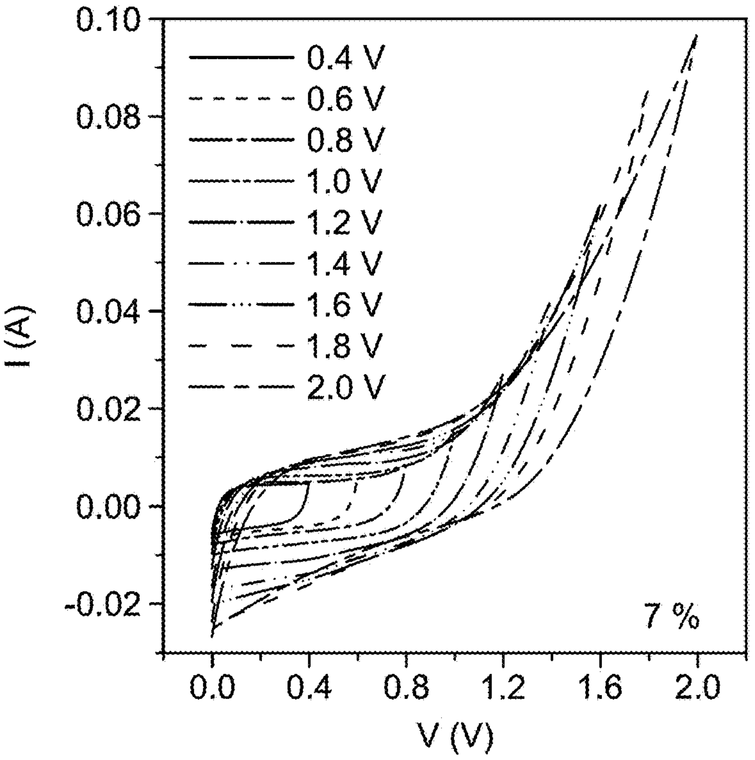
FIG. 6B shows an effect of applying various voltages ranging from 0.4 to 2.0 V for $Na_2SO_4$ electrolyte measured at 10 mV/s for 7% ZNV@BC nanocomposite, according to certain embodiments.
Figure 6C:
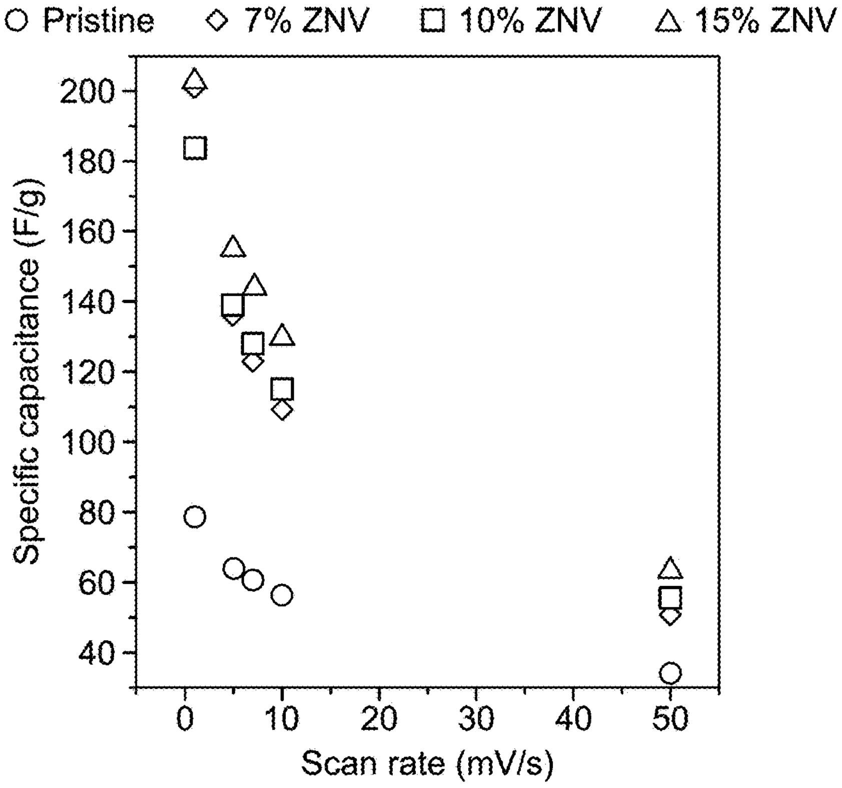
FIG. 6C is a plot showing variation of specific capacitance with scan rate for pristine, 7%, 10%, and 15% ZNV@BC nanocomposites, according to certain embodiments.

FIGS. 5A-5D show CV curves for BC-CC-PVDF, 7%, 10%, and 15% ZNV@BC nanocomposite, respectively, demonstrating the interaction between the electrolyte and the electrode surface. FIGS. 6A-6B show an effect of applying various voltages ranging from 0.4 V to 2.0 V for $Na_2SO_4$ electrolyte measured at 10 mV/s for pristine BC-CC-PVDF and 7% ZNV@BC nanocomposite, respectively. The window voltage was carefully chosen to maintain high coulombic efficiency, with a maximum value of 0.8 V, to avoid overcharging and excessive polarization. FIG. 6C is a plot showing the variation of specific capacitance with scan rate for pristine, 7%, 10%, and 15% ZNV@BC nanocomposites. The ZNV@BC device with 7% ZNV exhibited an excellent capacitance performance of 200 farads per gram (F/g), representing a 156% increase at 1 mV/s, while the 15% ZNV@BC device showed minimal improvement beyond 158%, suggesting a saturation point in capacitance. The electrochemical stability in terms of specific capacitance and Coulombic efficiency (EC) is shown in FIG. 6C for the 7% ZNV@BC and pristine devices.

Figure 6D:
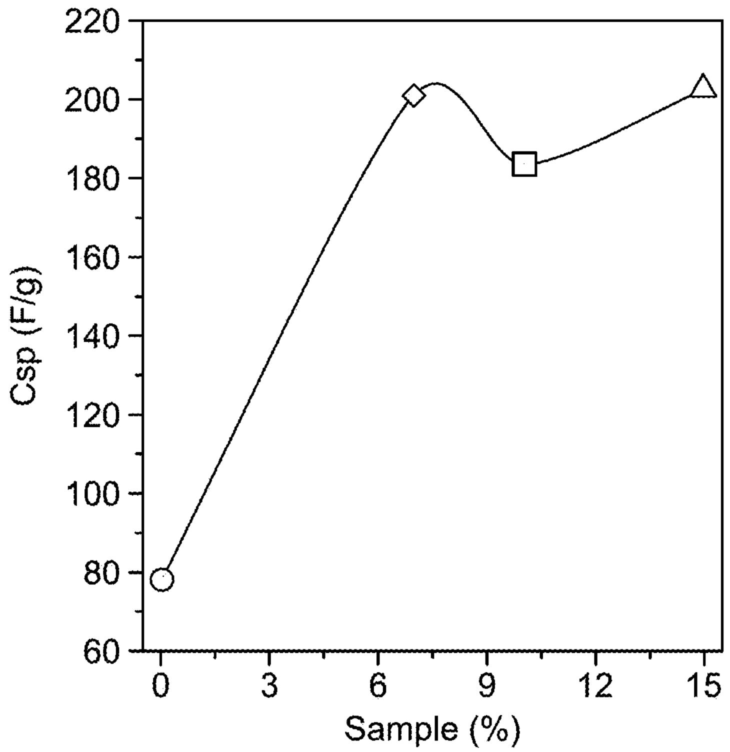
FIG. 6D shows specific capacitance ranging values as a function of the concentration of ZNV in BC matrix measured at 1 mV/s in a three-electrode cell, according to certain embodiments.
Figure 7A:
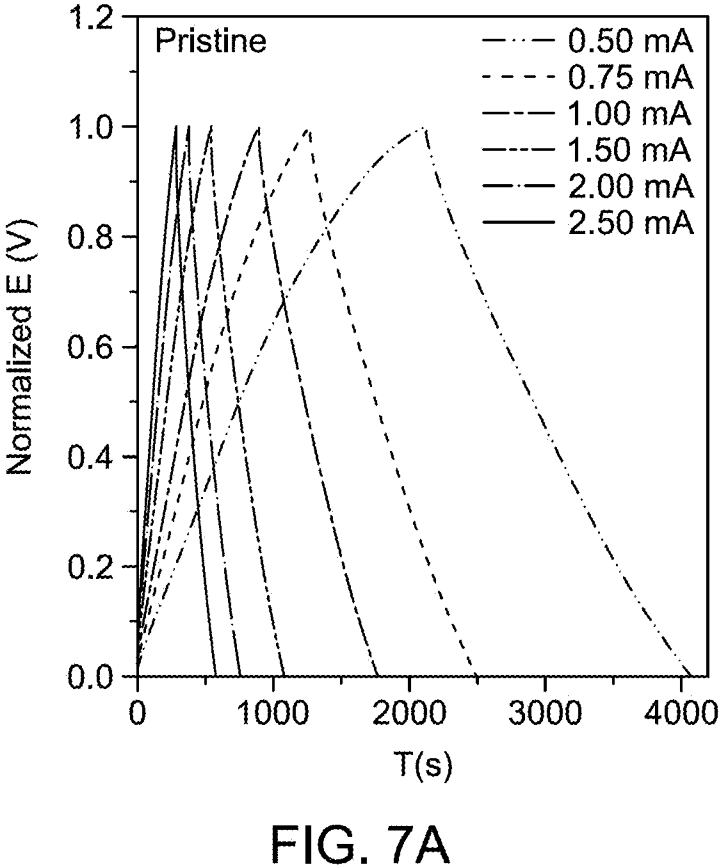
FIG. 7A shows galvanostatic charge-discharge (GCD) curves for pristine BC-CC-PVDF for all applied currents, according to certain embodiments.
Figure 7B:
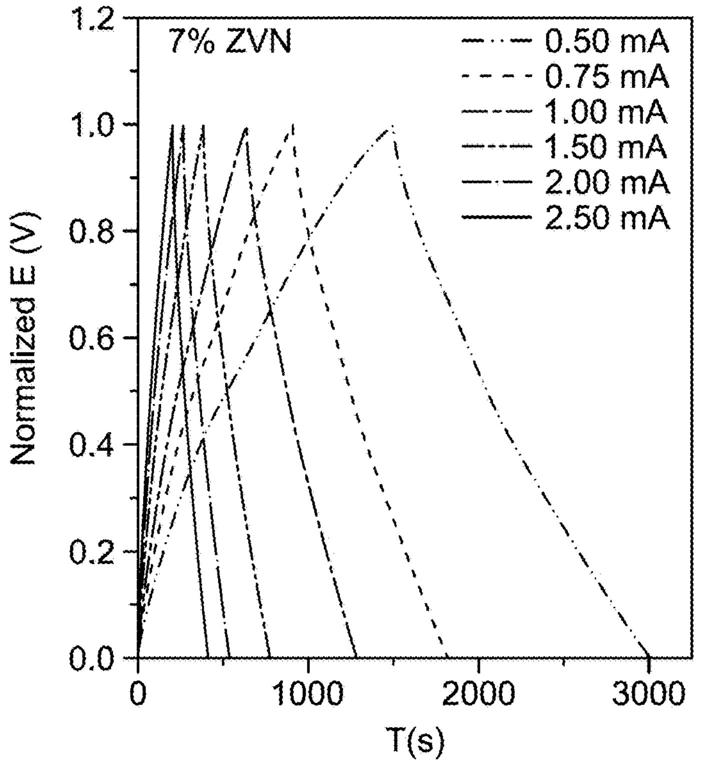
FIG. 7B shows GCD curves for 7% ZNV composite for all applied currents, according to certain embodiments.

FIG. 6D shows specific capacitance ranging values as a function of the concentration of ZNV in BC matrix measured at 1 mV/s-measured in three-electrode cell. The charge storage kinetics analysis revealed that the 7% ZNV@BC device demonstrated a shift towards diffusion-controlled kinetics (92% pseudocapacitance) compared to the pristine device (55% pseudocapacitance). This behavior is consistent with previous studies on nanoporous metal oxides. The ZNV@BC device demonstrates higher capacitance performance than the pristine device, with near 100% charge efficiency (EC≈100%) measured in a two-electrode cell system. As the cycling number increases (FIG. 6C), specific capacitance remains stable at the initial values measured in a three-electrode cell (200 F/g for 7% ZNV@BC and 80 F/g for the pristine device, followed by a slight decrease in capacitance values at higher cycle numbers, measured at 1 mA. FIG. 7A shows galvanostatic charge-discharge (GCD) curves for pristine BC-CC-PVDF for all applied currents. FIG. 7B shows GCD curves for 7% ZNV composite for all applied currents.

Figure 7C:
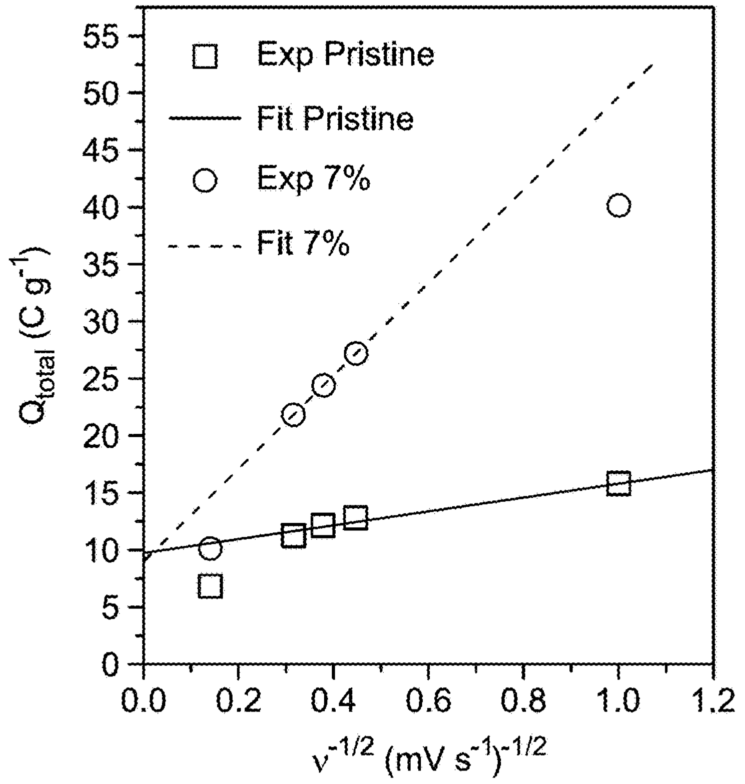
FIG. 7C is a plot showing an estimation of total stored charge ($Q_{total}$) versus the square root of the scan rate ($v^{-1/2}$), derived from CV, according to certain embodiments.
Figure 7D:
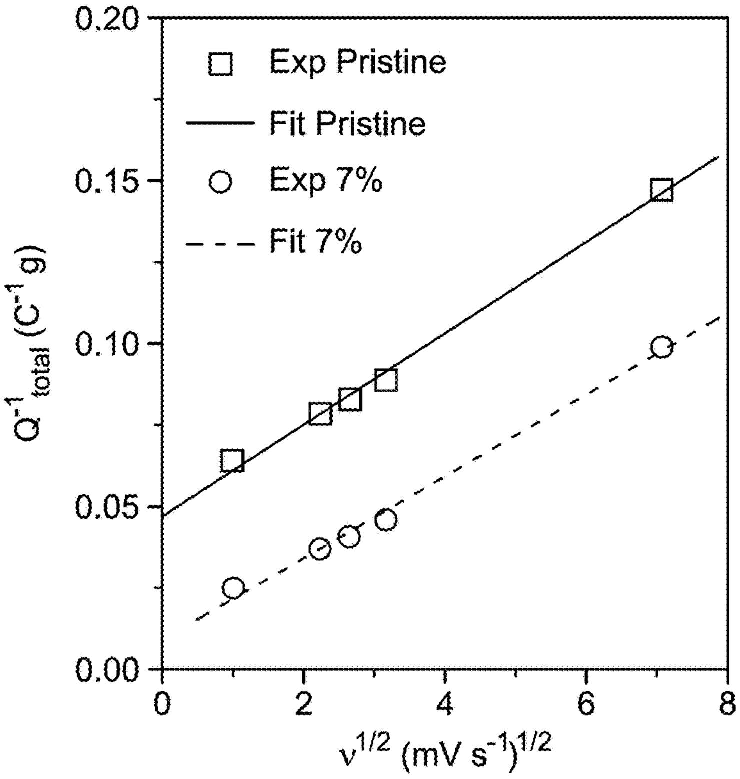
FIG. 7D is a plot showing an estimation of inverse total stored charge ($Q_{total}^{-1}$) versus the scan rate raised to the power of one-half ($v^{1/2}$), derived from CV, according to certain embodiments.

To categorize the material's intrinsic charge storage kinetics of electrodes, Trasatti and research group [See: Ardizzone, S., et al., "Inner" and "outer" active surface of RuO2 electrodes, *Electrochimica Acta*, Volume 35, Issue 1, 1990, Pages 263-267, which is incorporated herein by reference] proposed a practical method to estimate the dominant controlled kinetic of material electrodes from the total voltammetric charge ($Q_t$). The total stored charge ($Q_t$) consists of the summation of dual charge components ($Q_{total}=Q_o+Q_i$)): the outer charge surface $Q_o$ arises from the physical adsorption of the direct contact of electrolyte ions and the outer surface of electrodes, and the inner charge $q_i$ arises from the contact of electrolyte ions to the inner surface of ZNV@BC nanocomposite electrodes that have voids, grain boundaries, pores, crevices, and cracks etc. Therefore, the instant storage from $Q_o$ (surface-controlled kinetics) is independent of the scan rate (v) and interchangeable with the contributed charge for electrical double-layer capacitance ($Q_{dl}$). On the contrary, $Q_i$ (Diffusion-controlled kinetics) is an exchangeable component with the contributed charge to pseudocapacitive performance ($Q_{pseudo}$). The storage charge from the outer surface can be estimated from the extrapolation of the total stored charge ($Q_{total}$) to $v \to \infty$ from the plot of $Q_{total}$ versus $v^{-1/2}$. In contrast, the inner charge surface ($Q_i$) can be calculated from the difference between $Q_{total}$ and $Q_o$ or $Q_{dl}$. FIG. 7C is a plot showing an estimation of total stored charge ($Q_{total}$) versus the square root of the scan rate ($v^{-1/2}$) and FIG. 7D is a plot showing an estimation of inverse total stored charge ($Q_{total}^{-1}$) versus the scan rate raised to the power of one-half ($v^{1/2}$), derived from CV. Interestingly, pristine device has roughly more dependent on diffusion-controlled kinetics ($Q_o \approx Q_{dl} \approx 9.73$ $Cg^{-1}$ (45%), $Q_i \approx Q_{pseudo} \approx 11.54$ $Cg^{-1}$ (55%)) to drastic huge dominance of diffusion kinetics for 7% ZNV@biochar device ($Q_o \approx Q_{dl} \approx 9.01$ $Cg^{-1}$ (8%), $Q_i \approx Q_{pseudo} \approx 99.22$ $Cg^{-1}$ (92%). The resultant agrees with literature and with the linearity behavior of $Q_{total}$ with the scan rates for the diffusion-controlled energy storage kinetics. Pandit and research group [See: Pandit, B., et al., V2O5 encapsulated MWCNTs in 2D surface architecture: Complete solid-state bendable highly stabilized energy efficient supercapacitor device, *Sci Rep,* 7, 43430, 2017], have reported the dominance of diffusion-controlled (99%) for nanoporous metal oxide $V_2O_5$ encapsulation over highly stable carbon material (multi-walled carbon nanotubes).

Figure 8A:
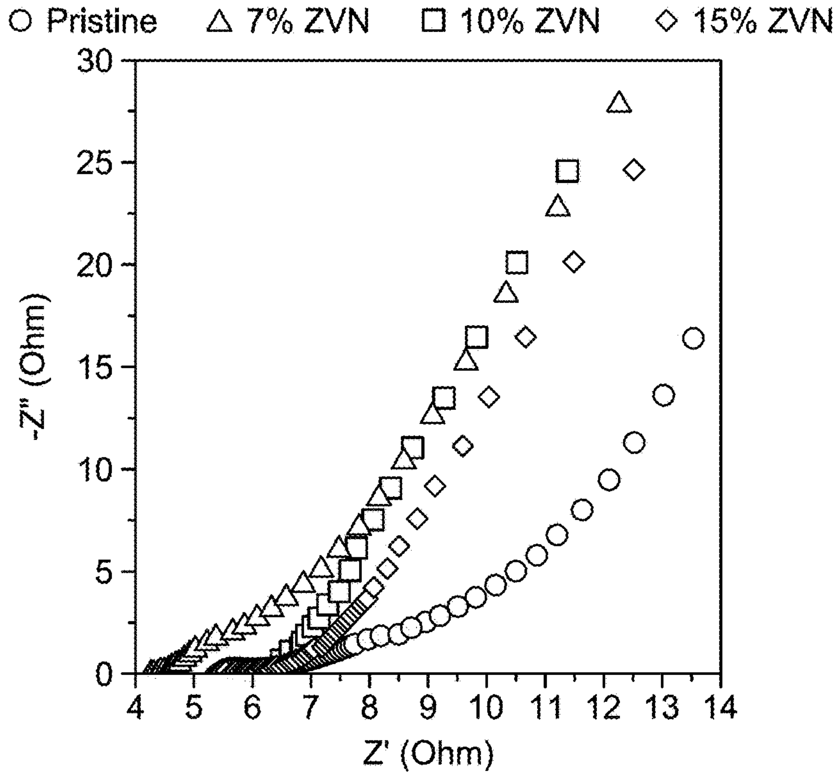
FIG. 8A shows a Nyquist plot for all weight percentages of ZNV@BC nanocomposite, according to certain embodiments.
Figure 8B:
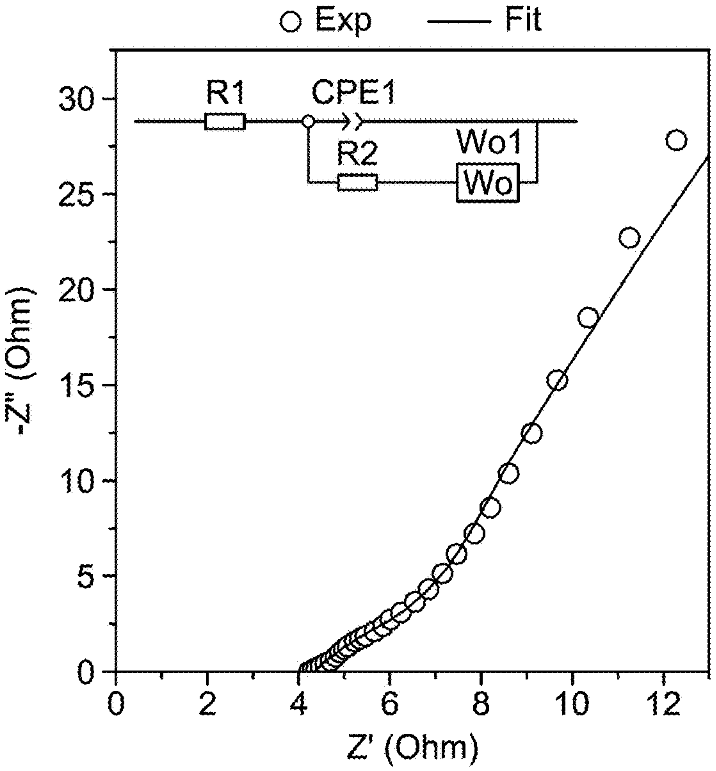
FIG. 8B shows a Nyquist plot for 7% ZNV@BC nanocomposite, according to certain embodiments.

FIGS. 8A-8B shows Nyquist plots for all weight percentages of ZNV@BC nanocomposite and 7% ZNV@BC nanocomposite. EIS measurements showed a small equivalent series resistance (ESR) for the 7% ZNV@BC device (4.2 ohms (Ω) at 2187.34 hertz (Hz) compared to other devices. Moving from higher frequencies (left side of FIG. 8A-B) to lower frequencies (right side of FIG. 8A-8B, $R_1$ (or equivalent series resistance, ESR), representing the total internal resistance of the cell in FIG. 8A, is the real part of the impedance at the intercept value where (−Z"=0). This Ohmic resistance represents the series equivalent resistance of the electrode material, the $Na_2SO_4$ electrolyte, and the resistance of the electrolyte within the pores of the carbon electrode in the biochar matrix (the dominant contribution). This is reflected by a small resistance value for the 7% ZNV@BC device (4.2Ω at 2187.34 Hz) compared to other devices (FIG. 8A).

The empirical model helps in understanding the dominant electrochemical kinetic reaction mechanism for the semicircle region (if it exists) and beyond for the slurry-coated electrodes. A parallel "RC" circuit can be observed as a semicircle region, which acts as a loop that delays or blocks the capacitive behavior, followed by a 45°-line region and a 90° angle line. These angle lines, showing a fast increase in the imaginary part of the impedance, indicate that all the reactive sites are fully accessible in a short time, leading to capacitor-like behavior. For slurry-coated electrodes, C. Portet and research group [See: Portet, C., et al., Modification of Al current collector surface by sol-gel deposit for carbon-carbon supercapacitor applications, *Electrochimica Acta*, Volume 49, Issue 6, 2004, pages 905-912] clarified the effect of treated electrodes and slurry coating on capacitance performance in electrochemical impedance spectroscopy (EIS) analysis. It was found that the "RC" semicircle-circuit region no longer exists in their thermally treated carbon-coated material, which was deposited on aluminum (Al) foils via the sol-gel route. Their study emphasized the importance of homogeneously depositing carbonaceous material onto the electrode surface to increase surface contact at the Al/active material interface and reduce the overall global resistance in the cell.

In this study, the "RC" semicircle circuit is not dominant for all devices. The slurry was deposited on working electrodes via casting, followed by moderate thermal annealing to enable adhesion. The Ohmic resistor $R_2$ (preserving DC conductivity) has a value of 13.4Ω for the 7% ZNV@BC device and is connected in series with the open Warburg element ($W_o$) and in parallel with the non-ideal capacitance element (Constant Phase Element, CPE) (FIG. 8B). The calculated specific capacitance from EIS analysis for the 7% ZNV@BC device shows identical results (22.3 F/g) using both $C=R_2^{(1-n)/n}\, Q^{(1/n)}$ or $C=Q/\{f^{(1-n)} \sin(n\pi/2)\}$, where C is capacitance, Q and n are fitting parameters, and f is the lowest frequency used in the impedance spectrum.

According to the transmission line model, the open Warburg element ($W_o$) manifests three operations: diffusion of ions from the electrolyte that fills the pores of the electrodes in a fine-length manner, transportation of electrons in the composite electrode through the carbon conductive matrix, and charging at the carbon-electrolyte interface. The estimated value of specific capacitance from EIS analysis coincides with CV measurements (FIG. 6C) at scan rates above 50 mV/s. The governing equation that describes the fitted parameters to evaluate the open Warburg element is: $Z_{Wo}=\{R_{Wo}/(T_{Wo}\times i\omega)^{PWo}\}\times\{\coth(T_{Wo}\times i\omega)^{PWo}\}$.

Figure 8C:
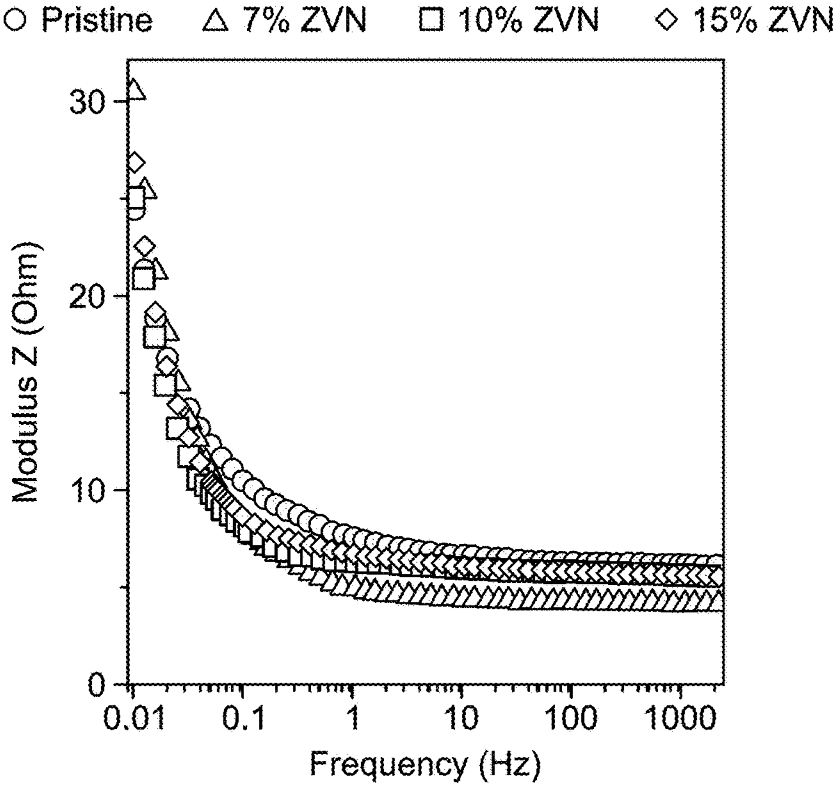
FIG. 8C shows a modulus impedance diagram for all weight percentages of ZNV@BC nanocomposite, according to certain embodiments.
Figure 8D:
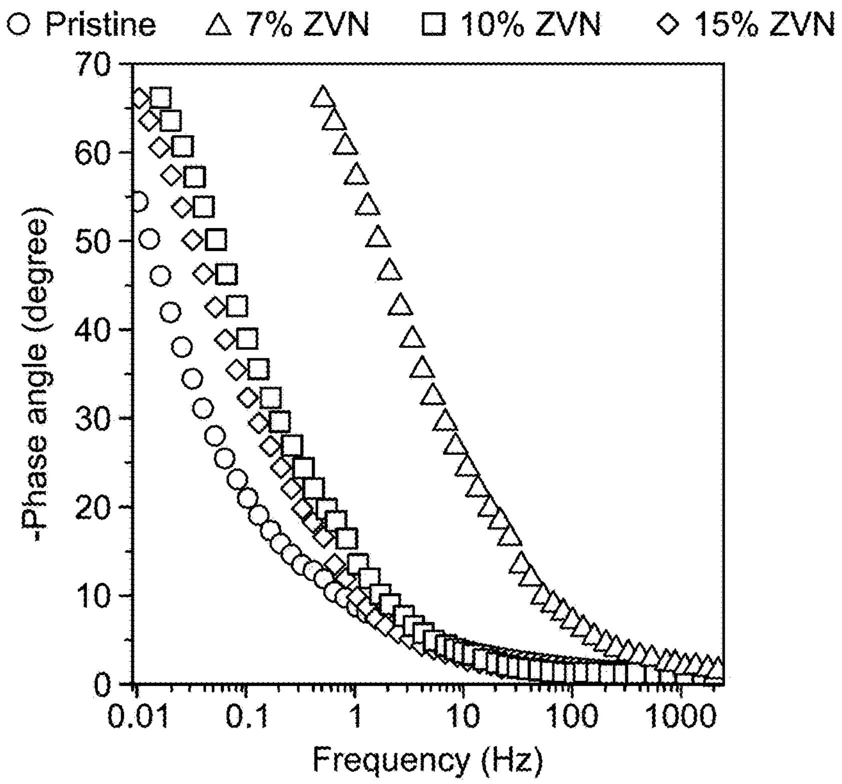
FIG. 8D shows Bode diagrams for all weight percentages of ZNV@BC nanocomposite, according to certain embodiments.

The fitted parameters—Warburg resistance ($R_{o1}$), time constant ($T_{o1}$), and deviation exponent ($P_{o1}$)—are associated with the sum of all the electrolyte resistances contained within the porous electrode, a characteristic time constant, and a deviation exponent related to non-ideal capacitive behavior (ideal behavior: $P_{o1}$=0.5). The values of fitted parameters related to open Warburg element for 7% ZVN @biochar are $R_{Wo1}$ or normalized Warburg resistance≈$1.233\times10^{-5}\pm3.91$ (Ω or Ω·$cm^2$, for 1 $cm^2$), $T_{Wo1}\approx1.833\times10^{-6}\pm0.59$ (s), and $P_{Wo1}\pm0.499\pm0.025$. The deviations exponent of $P_{Wo1}(0.499\pm0.025)$ from the ideal capacitance behavior agrees with our previous analysis of the tendency of diffusion-controlled as the device exhibits low Warburg resistance ($1.233\times10^{-5}\pm3.91$ (Ω or Ω·$cm^2$)) or less difficulty for electrolyte ions to diffuse in the electrodes. FIG. 8C shows a modulus impedance diagram, and FIG. 8D shows Bode diagrams for all weight percentages of ZNV@BC nanocomposite. FIG. 8 demonstrates the typical spectra behavior for the total impedance modules and phase angles with the frequency. Overall, adding the ZNV enhances the capacitance performance by increasing the phase angle values compared to the pristine device.

Figure 9A:
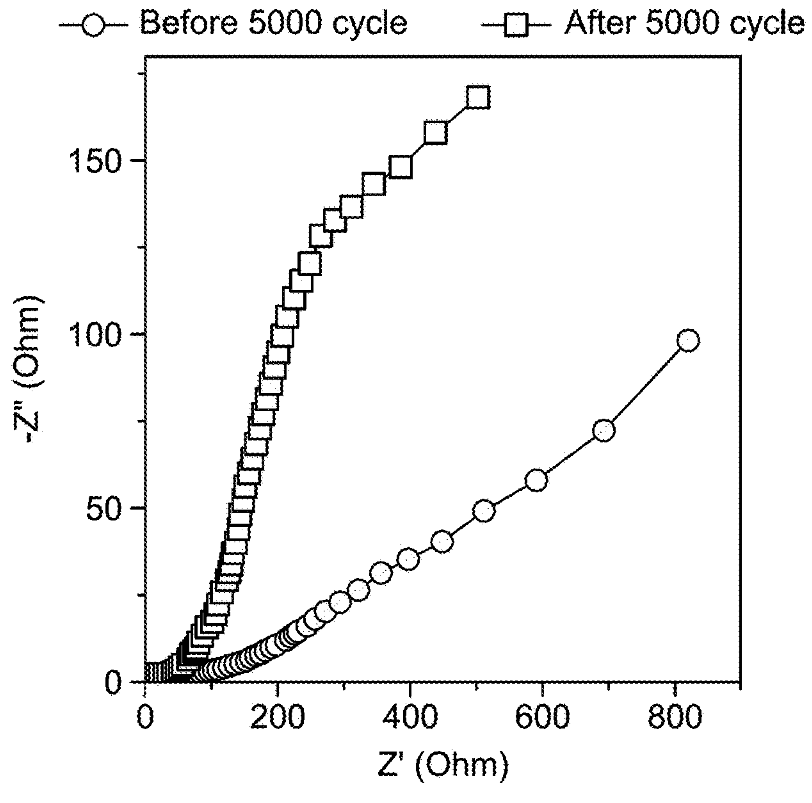
FIG. 9A shows a Nyquist plot for 7% ZNV@BC nanocomposite after applying the 5000 cycles measured in the coin cell at 1 mA, according to certain embodiments.
Figure 9B:
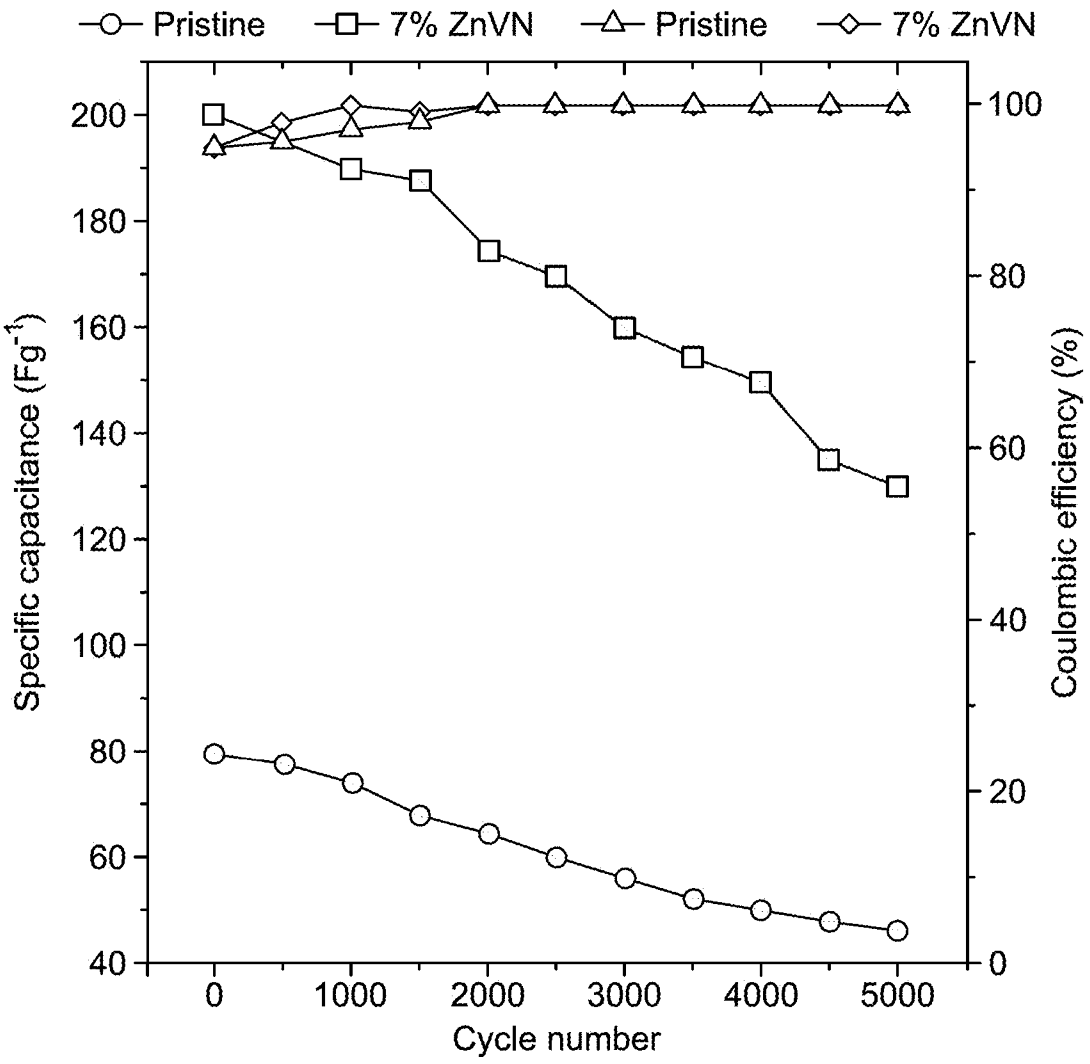
FIG. 9B is a plot showing the retention of specific capacitances and coulombic efficiency for pristine and 7% ZNV@BC devices throughout all applied cycles measured in the coin cell, according to certain embodiments.

Care must be taken during two-electrode EIS measurements, as passivation layers may form by measuring spectra directly from the bare metal or non-treated aluminum foil. FIG. 9A shows a Nyquist plot for 7% ZNV@BC nanocomposite after applying the 5000 cycles measured in the coin cell at 1 mA. The Nyquist plot showed an improvement in capacitance and impedance characteristics after 5000 charge/discharge cycles, with the 7% ZNV@BC device exhibiting enhanced electrochemical stability, particularly in terms of phase angle and capacitance. FIG. 9B is a plot showing retention of specific capacitances and coulombic efficiency for pristine and 7% ZNV@BC devices throughout all applied cycles measured in the coin cell. The 7% ZNV@BC device demonstrated excellent cyclic stability with a 35% reduction in capacitance after 5000 cycles, compared to a 42.5% reduction for the pristine device. The coulombic efficiency remained near 100% throughout the cycling tests. This can be observed in the impedance spectra (Nyquist plot) of FIG. 9A for the 7% ZNV@BC device (the values of Z' in FIG. 9A are 100 times higher than those in FIG. 8B, even though the specific capacitance is comparable, as the tendency toward pseudocapacitive behavior decreases (FIG. 9A). The Nyquist plot is recorded before and after the cycling stability test for the 7% ZNV@BC device in FIG. 9A. After 5000 cycles, the EIS spectra show a tendency towards ideal capacitance performance (a much steeper slope), which may be attributed to an enhanced outer surface interaction of electrolyte ions and reduced diffusion resistance for ZNV@BC.

During the process of full charging, as the cycling number increases (FIG. 9C), the specific capacitance of the devices is initially maintained at the same values as measured in the three-electrode cell during the first cycles (200 F/g for the 7% ZNV@BC device and 80 F/g for the pristine device). However, at higher cycling numbers, a decrease in specific capacitance is observed when measured at 1 mA. This could be attributed to enhanced electrolyte ion exchange on the outer surface of the electrode, rather than the inner surface (FIG. 9A), as the flower-like morphology diminishes with time, possibly reflecting a reduction in the specific capacitance of the 7% ZNV@BC device.

The measured capacitances were calculated from the GCD curve using the equation C=I/(dV/dt), where I is the discharge current and dV/dt was calculated from the slope of the GCD discharge curve after the short IR potential range. The gravimetric capacitance ($C_{SP}$) for GCD was calculated using $C_{SP}$=2×C/m, where m is the mass per electrode. Coulombic efficiency was calculated from the discharge capacity ratio to charge capacity. To evaluate the cyclic charge-discharge performance of the pristine and 7% ZNV@BC-based devices, 5000 GCD cycles were conducted at a current of 1 A/g, and the results are shown in FIG. 9B. The 7% ZNV@BC material demonstrates enhanced initial and long-term performance compared to the pristine material. Initially, the 7% ZNV@BC device exhibits a higher specific capacitance (200 F/g) than the pristine material (80 F/g). After 2000 cycles, the 7% ZNV@BC retains 175 F/g, while the pristine material has only 64 F/g. The specific capacitance reduction for the 7% ZNV@BC is 12.5% over 2000 cycles, compared to a 20% reduction for the pristine material. Over 5000 cycles, the 7% ZNV@BC shows a 35% reduction from its initial capacitance, while the pristine material experiences a 42.5% reduction. This data indicates that the 7% ZNV@BC not only starts with higher capacitance but also demonstrates better cycle stability and durability, with a slower rate of degradation compared to the pristine material. Despite the decrease in specific capacitance values with increasing cycle numbers for both materials, no reduction in Coulombic efficiency has been observed.

Figure 9C:
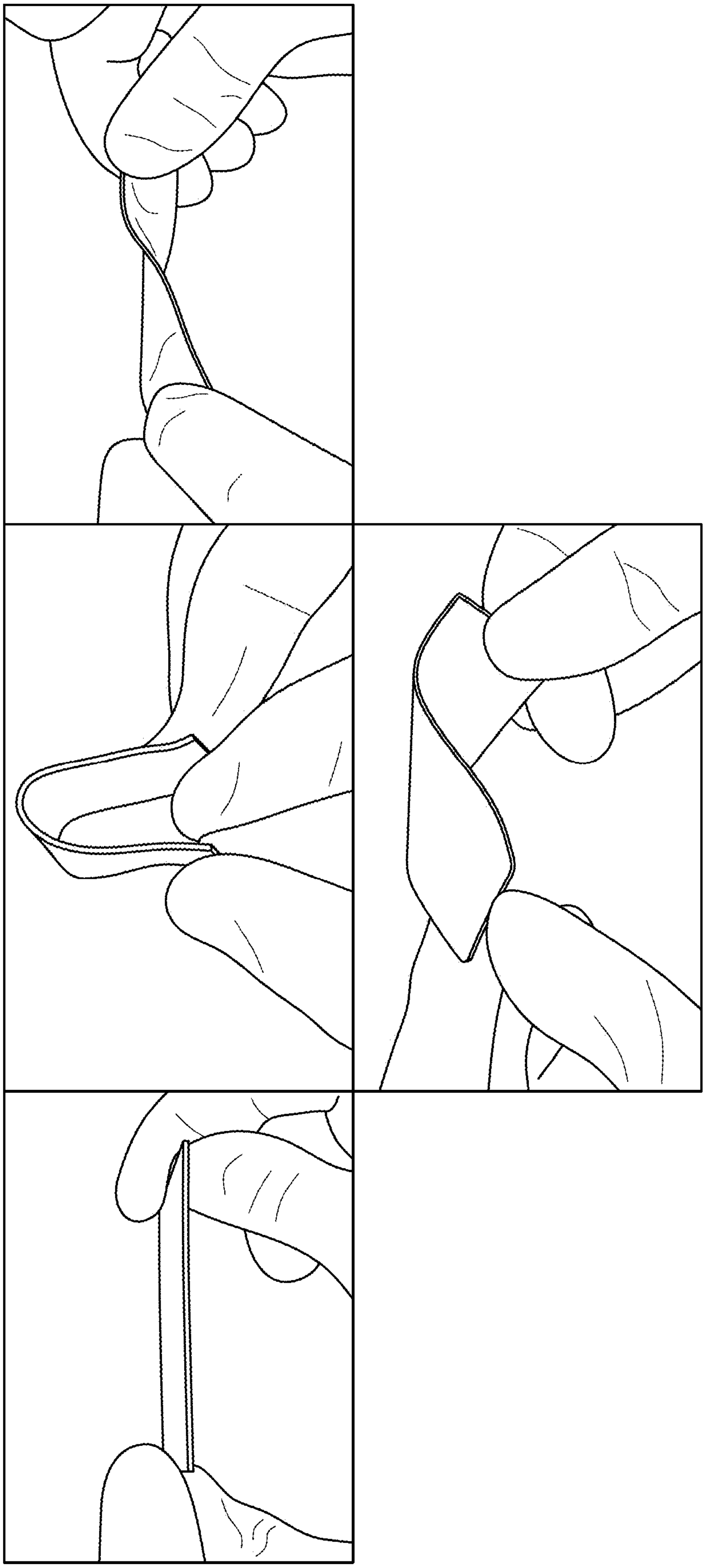
FIG. 9C shows real-time images illustrating mechanical flexibility for the 7% ZNV@BC nanocomposite tested for different angle folds, according to certain embodiments.
Figure 9D:
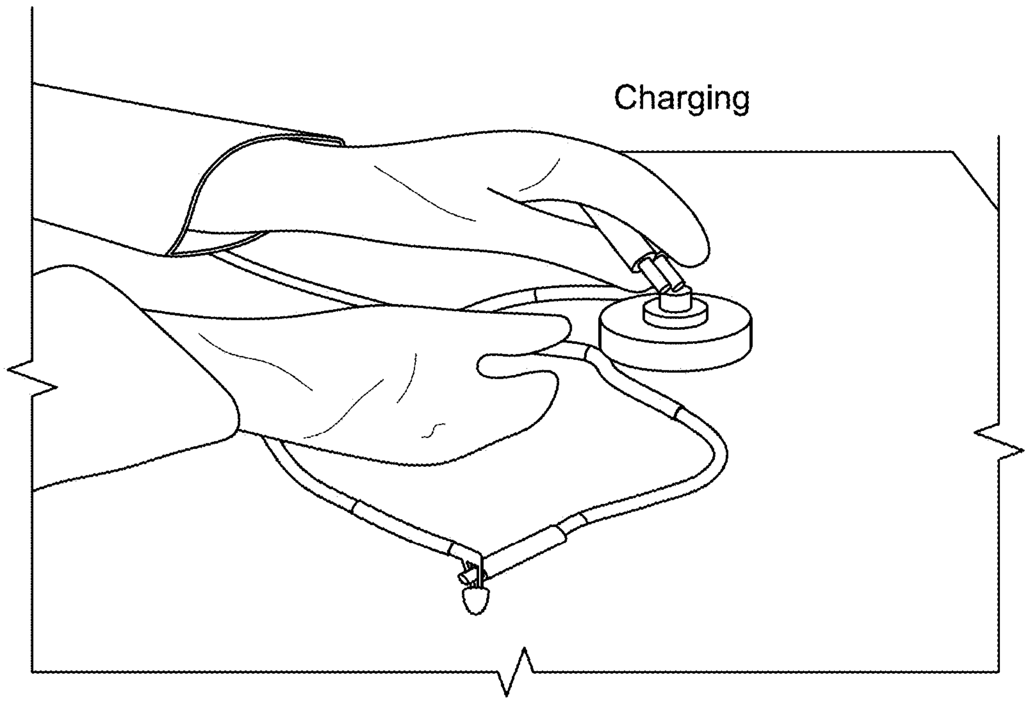
FIG. 9D depicts a real-time image illustrating a potential 7% ZNV@BC device in lighting LEDs for 1 minute (min) during charging, according to certain embodiments.
Figure 9E:
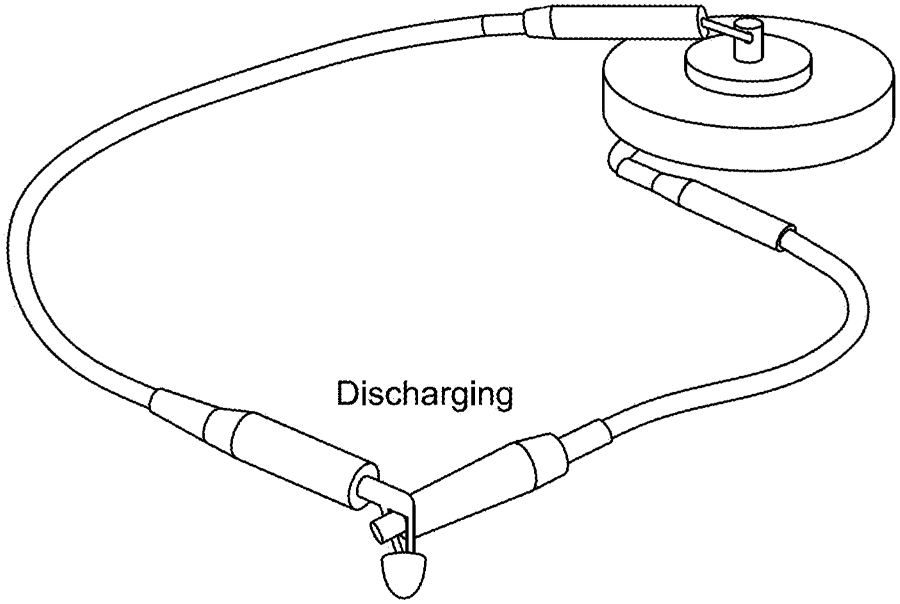
FIG. 9E depicts a real-time image illustrating a potential 7% ZNV@BC device in lighting LEDs for 1 min during discharging, according to certain embodiments.

Furthermore, the mechanical flexibility of the 7% ZNV@BC device was tested at various angles as shown in FIG. 9C. To demonstrate the 7% ZNV@BC device's potential, an LED light was connected after charging for 5 seconds(s) at 1.5 V using a Gwinstek power supply. The device was able to light the LED for almost 1 min during discharge. FIG. 9D-9E depicts real time image illustrating a potential 7% ZNV@BC device in lighting LED for 1 min [charging] and [discharging], respectively. It successfully powered an LED light for almost 1 min after being charged for 5 s at 1.5 V, illustrating the potential for flexible energy storage applications.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A capacitor including:

electrodes including a composite electrode composition including:

zinc-vanadium-nickel oxide ($ZnV_2O_4$/NiO)(ZNV) particles;

a biochar (BC);

a conductive carbon (CC); and a polymer binder, a dielectric separator; and an electrolyte;

wherein the amount of ZNV particles present in the composite electrode composition is in a range from 1-20 weight percent (wt. %) relative to the combined amount of the BC, CC, and polymer binder, wherein the specific capacitance of the composite electrode composition is greater than or equal to 150 farad per gram (F/g) measured at 1 millivolts per second (mV/s).

2. The capacitor of claim 1, wherein the amount of the ZNV particles present in the composite electrode composition is in a range from 3-15 wt. % relative to the combined amount of the BC, CC, and polymer binder.

3. The capacitor of claim 2, wherein the amount of the ZNV particles present in the composite electrode composition is in a range from 6-8 wt. % relative to the combined amount of the BC, CC, and polymer binder.

4. The capacitor of claim 1, wherein the amount of the BC present in the composite electrode composition is in a range from 60 to 95 wt. % of the total amount of the BC, CC, and polymer binder.

5. The capacitor of claim 4, wherein the amount of the BC present in the composite electrode composition is in a range from 75 to 85 wt. % of the total amount of the BC, CC, and polymer binder.

6. The capacitor of claim 5, wherein the amount of the BC present in the composite electrode composition is 80 wt. % of the total amount of the BC, CC, and polymer binder.

7. The capacitor of claim 1, wherein the amount of the CC present in the composite electrode composition is in a range from 2 to 20 wt. % of the total amount of the BC, CC, and polymer binder.

8. The capacitor of claim 7, wherein the amount of the CC present in the composite electrode composition is in a range from 5 to 15 wt. % of the total amount of the BC, CC, and polymer binder.

9. The capacitor of claim 8, wherein the amount of the CC present in the composite electrode composition is 10 wt. % of the total amount of the BC, CC, and polymer binder.

10. The capacitor of claim 8, wherein the amount of the polymer binder present in the composite electrode composition is in a range from 5 to 15 wt. % of the total amount of the BC, CC, and polymer binder.

11. The capacitor of claim 10, wherein the amount of the polymer binder present in the composite electrode composition is 10 wt. % of the total amount of the BC, CC, and polymer binder.

12. The capacitor of claim 1, wherein the amount of the polymer binder present in the composite electrode composition is in a range from 2 to 20 wt. % of the total amount of the BC, CC, and polymer binder.

13. The capacitor of claim 1, wherein the specific capacitance of the composite electrode composition is greater than or equal to 170 F/g measured at 1 mV/s.

14. The capacitor of claim 13, wherein the specific capacitance of the composite electrode composition is greater than or equal to 190 F/g measured at 1 mV/s.

15. The capacitor of claim 1, wherein the ZNV particles have two-dimensional petal-like morphologies and a diameter in the range of 0.5 to 20 micrometers (μm).

16. The capacitor of claim 15, wherein the ZNV particles have a diameter in the range of 1 to 10 μm.

17. The capacitor of claim 16, wherein the ZNV particles have a diameter in the range of 3 to 7 μm.

18. The capacitor of claim 1, wherein the specific capacitance of the composite electrode composition is greater than or equal to 180 F/g measured after 2000 applied cycles in a coin cell.

19. The capacitor of claim 1, wherein the specific capacitance of the composite electrode composition is greater than or equal to 150 F/g measured after 4000 applied cycles in a coin cell.

20. The capacitor of claim 1, wherein the specific capacitance of the composite electrode composition is greater than or equal to 130 F/g measured after 5000 applied cycles in a coin cell.

* * * * *